(12) United States Patent
Harada et al.

(10) Patent No.: US 10,821,778 B2
(45) Date of Patent: Nov. 3, 2020

(54) TIRE

(71) Applicant: BRIDGESTONE CORPORATION, Chuo-ku, Tokyo (JP)

(72) Inventors: Takashi Harada, Yokohama (JP); Hiroyuki Fudemoto, Kodaira (JP); Kunio Machida, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 1216 days.

(21) Appl. No.: 14/381,768

(22) PCT Filed: Feb. 28, 2013

(86) PCT No.: PCT/JP2013/055582
§ 371 (c)(1),
(2) Date: Aug. 28, 2014

(87) PCT Pub. No.: WO2013/129627
PCT Pub. Date: Sep. 6, 2013

(65) Prior Publication Data
US 2015/0053323 A1 Feb. 26, 2015

(30) Foreign Application Priority Data

Feb. 29, 2012 (JP) ................... 2012-044642
Feb. 29, 2012 (JP) ................... 2012-044643

(51) Int. Cl.
*B60C 5/01* (2006.01)
*B60C 9/22* (2006.01)
(Continued)

(52) U.S. Cl.
CPC ............... *B60C 5/007* (2013.01); *B60C 1/00* (2013.01); *B60C 5/01* (2013.01); *B60C 9/0007* (2013.01);
(Continued)

(58) Field of Classification Search
CPC .. B60C 5/01; B60C 5/007; B60C 1/00; B60C 9/2204; B60C 9/0007; B60C 2009/0021;
(Continued)

(56) References Cited

U.S. PATENT DOCUMENTS 3,386,485 A * 6/1968 Harrison ................ B60C 5/01
152/452
6,306,954 B1 10/2001 Nishikawa et al.
(Continued)

FOREIGN PATENT DOCUMENTS

CN 1255937 A 6/2000
EP 0969068 A1 1/2000
(Continued)

OTHER PUBLICATIONS

English machine translation of JP 2012-35435 A, Feb. 23, 2012.*
(Continued)

*Primary Examiner* — Adrienne C. Johnstone
(74) *Attorney, Agent, or Firm* — Sughrue Mion, PLLC

(57) ABSTRACT

A tire including a circular tire frame formed of a resin material, and a metal reinforcing cord member wound on the outer circumference of the tire frame, wherein at least a portion of the metal reinforcing cord member is covered by a covering mixture including at least an olefin-based thermoplastic resin and a thermoplastic resin other than the olefin-based thermoplastic resin.

8 Claims, 5 Drawing Sheets

(51) Int. Cl.
*B60C 1/00* (2006.01)
*B60C 5/00* (2006.01)
*B60C 9/00* (2006.01)
*C08L 23/08* (2006.01)

(52) U.S. Cl.
CPC .... B60C 9/2204 (2013.01); *B60C 2009/0021* (2013.01); *B60C 2009/0071* (2013.01); *B60C 2009/0078* (2013.01); *B60C 2009/228* (2013.01); *B60C 2009/2214* (2013.01); *B60C 2009/2238* (2013.01); *B60C 2009/2242* (2013.01); *B60C 2009/2261* (2013.01); *C08L 23/0869* (2013.01)

(58) Field of Classification Search
CPC .... B60C 2009/0071; B60C 2009/0078; B60C 2009/2214; B60C 2009/2238; B60C 2009/2242; B60C 2009/2261; B60C 2009/228
USPC ........................................................ 152/452
See application file for complete search history.

(56) References Cited

U.S. PATENT DOCUMENTS

| | | | |
|---|---|---|---|
| 9,440,407 B2 | 9/2016 | Kouno et al. | |
| 2002/0053386 A1 | 5/2002 | Hirachi et al. | |
| 2005/0121126 A1 | 6/2005 | Hirachi et al. | |
| 2011/0297289 A1* | 12/2011 | Kouno | B60C 5/01 |
| 2012/0152428 A1* | 6/2012 | Kouno | B60C 5/007 |
| 2013/0206301 A1* | 8/2013 | Fudemoto | B60C 5/01 |
| 2013/0206311 A1* | 8/2013 | Fudemoto | B60C 5/007 |
| 2015/0053327 A1* | 2/2015 | Harada | B60C 5/01 |
| 2016/0303905 A1* | 10/2016 | Fudemoto | B60C 5/01 |

FOREIGN PATENT DOCUMENTS

| | | | | |
|---|---|---|---|---|
| JP | 61-296079 A | | 12/1986 | |
| JP | 3-143701 A | | 6/1991 | |
| JP | 2003-104008 A | | 4/2003 | |
| JP | 4423772 B2 | | 3/2010 | |
| JP | 4465916 B2 | | 5/2010 | |
| JP | 2012-35435 A | | 2/2012 | |
| WO | 99/35206 A1 | | 7/1999 | |
| WO | WO-2011/021702 A1 | * | 2/2011 | |
| WO | WO-2012/026547 A1 | * | 3/2012 | .............. B60C 5/01 |
| WO | WO-2012/026548 A1 | * | 3/2012 | .............. B60C 5/01 |

OTHER PUBLICATIONS

"Hildebrand solubility parameter", Wikipedia online article based on a 1984 reference.*
"Hansen solubility parameter", Wikipedia online article based on a 1967 reference.*
English machine translation of JP 61-296079 A, Dec. 26, 1986.*
International Search Report for PCT/JP2013/055582 dated Jun. 4, 2013.
Communication dated Jan. 4, 2016, issued by the State Intellectual Property Office of the P.R.C. in corresponding Chinese Application No. 201380011585.0.
Communication dated Nov. 13, 2015, from the European Patent Office in counterpart European Application No. 13754304.7.

* cited by examiner

TIRE

CROSS REFERENCE TO RELATED APPLICATIONS

This application is a National Stage of International Application No. PCT/JP2013/055582 filed Feb. 28, 2013, claiming priority based on Japanese Patent Application Nos. 2012-044642 filed Feb. 29, 2012 and 2012-044643 filed Feb. 29, 2012.

TECHNICAL FIELD

The present invention relates to a tire for fitting onto a rim, and in particular relates to a tire in which at least a portion is formed of a thermoplastic material.

BACKGROUND ART

Pneumatic tires configured from rubber, organic fiber materials, steel members, and the like have been conventionally employed in vehicles such as cars.

Recently, the use of resin materials, in particular thermoplastic resins, thermoplastic elastomers, and the like, as tire materials is being investigated from the perspectives of weight reduction, ease of molding, and ease of recycling.

For example, Patent Document 1 and Patent Document 2 describe pneumatic tires formed using a thermoplastic polymer material, in particular a polyester-based thermoplastic elastomer.

A tire in which a polymer material (a resin material) with thermoplastic properties is used is more easily manufactured and lower in cost than a conventional rubber-made tire. There is demand to achieve performance (demanded properties of tire) that compares favorably to conventional rubber-made tires, while also achieving an increase in manufacturing efficiency and cost reduction, when manufacturing tires using a thermoplastic polymer material.

However, when a tire is formed with only a uniform thermoplastic resin without incorporating a reinforcing member such as a carcass ply, such as in JP-A No. 2003-104008, it is difficult to achieve a tire that withstands stress, withstands internal pressure, and exhibits rigidity similarly to conventional rubber-made tires. In JP-A No. H03-143701, a reinforcing layer, in which a reinforcing cord is wound in a continuous helical shape along a tire circumferential direction, is provided on the outer surface in the tire radial direction of a tread bottom portion of a tire main body (tire frame), whereby cut resistance performance and puncture resistance performance of the tire main body are improved.

Examples of technology relating to steel cords (wires) used in reinforcing layers (belt layers) include proposals for a steel cord for a tire employable in a carcass layer, a bead reinforcing layer, and a belt layer of a radial tire (see Japanese Patent No. 4423772), and a pneumatic tire in which a steel cord, constituted by a steel wire covered by a thermoplastic elastomer composition, is used as a belt layer (belt portion) or a reinforcing material of a carcass portion (see Japanese Patent No. 4465916).

SUMMARY OF INVENTION

Technical Problem

Generally, in terms of tire performance, there is demand for sufficient fixing of a reinforcing cord to a tire frame in cases where a reinforcing cord is used. However, when a metal member such as a steel cord is used as a reinforcing cord, satisfactory adhesion between the reinforcing cord and the tire frame is difficult under ordinary molding conditions. Following investigation, the present inventors have found that the durability of a tire itself can be improved by improving the adhesion durability between a tire frame and a reinforcing member such as a steel cord so as to withstand vibrations and the like during running.

In contrast to this, the steel cords for use in tires described in Japanese Patent No. 4423772 have a thermoplastic elastomer composition loaded into a steel structure constituted by a twisted construction of a core, formed of wire, and a sheath. However, such technology is intended for installation to rubber-made radial tires, and there is no mention of a relationship between a tire in which a resin material is used and a reinforcing member. Also in respect to the tire described in Japanese Patent No. 4465916, there is no mention of raising the adhesion durability between a reinforcing member and a tire frame for tires in which a resin material is used as a tire frame.

In consideration of the above circumstances, there is demand for a tire that is formed of a resin material and has excellent adhesion durability between a reinforcing cord and a tire frame.

Solution to Problem

A tire of the invention comprises: a circular tire frame formed of a resin material; and a metal reinforcing cord member wound on an outer circumference of the tire frame, wherein at least a portion of the metal reinforcing cord member is covered by a covering mixture including at least an olefin-based thermoplastic resin and a thermoplastic resin other than the olefin-based thermoplastic resin.

Advantageous Effects of Invention

According to the invention, there is provided a tire that is formed of a resin material and has excellent adhesion durability between a metal reinforcing cord member and a tire frame.

DESCRIPTION OF EMBODIMENTS

Figure 1A:
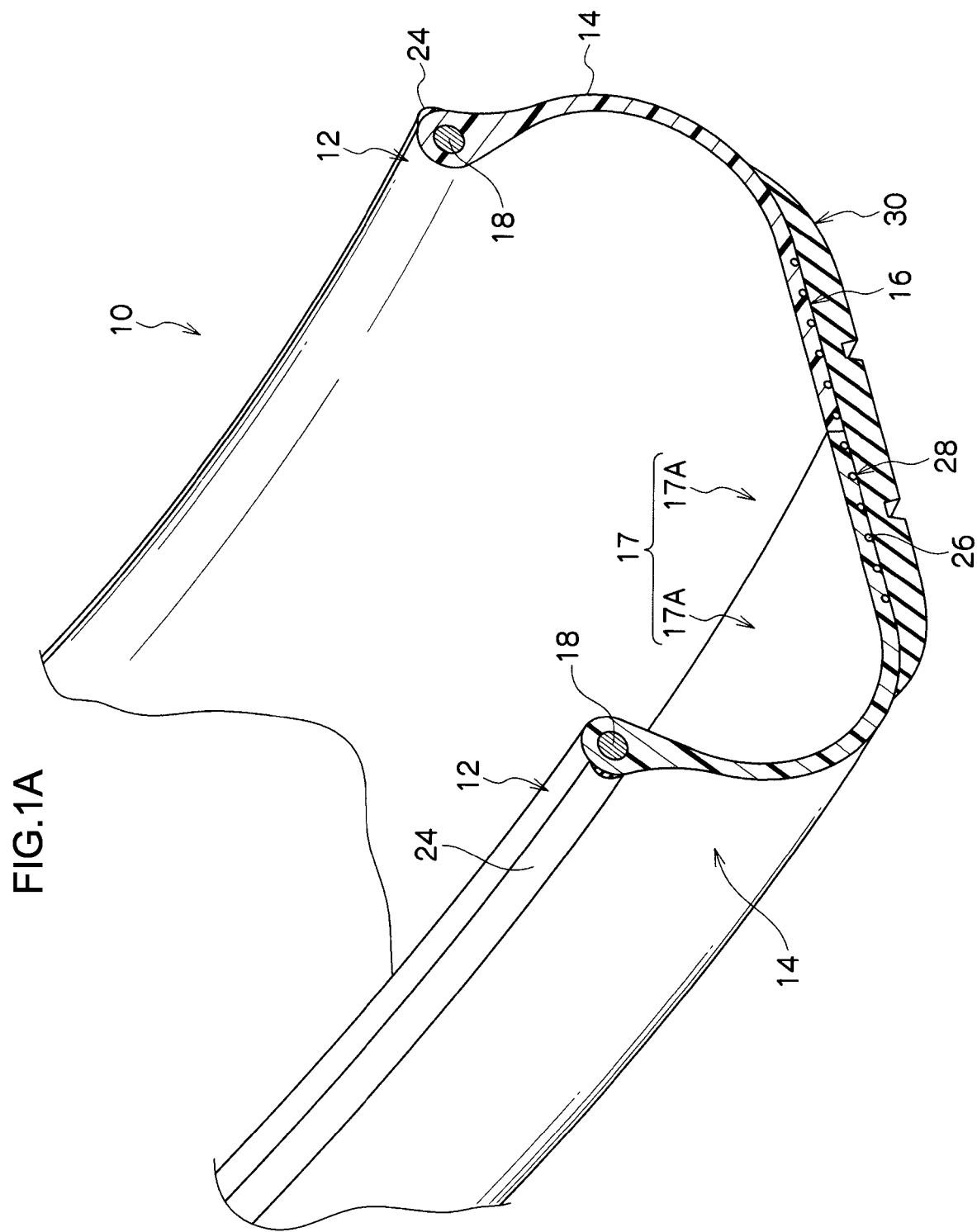
FIG. 1A is a perspective view illustrating a cross-section of a portion of a tire according to an embodiment of the invention.

As described above, the tire of the invention comprises: a circular tire frame formed of a resin material; and a metal reinforcing cord member wound on an outer circumference of the tire frame, wherein at least a portion of the metal reinforcing cord member is covered by a covering mixture including at least an olefin-based thermoplastic resin and a thermoplastic resin other than the olefin-based thermoplastic resin.

Amongst these, in a first tire of the invention, the olefin-based thermoplastic resin is an acid-modified olefin-based thermoplastic resin having an elastic modulus of 140 MPa or greater, and the thermoplastic resin other than the olefin-based thermoplastic resin is included at from 55% by mass to 95% by mass. Namely, the metal reinforcing cord member is covered by a covering mixture (also referred to below as a "first specific covering mixture") including at least an acid-modified olefin-based thermoplastic resin having an elastic modulus of 140 MPa or greater, and a thermoplastic resin other than the acid-modified olefin-based thermoplastic resin at from 55% by mass to 95% by mass.

Note that the elastic modulus of the acid-modified olefin-based thermoplastic resin means the tensile elastic modulus as defined by JIS K7113:1995 of the acid-modified olefin-based thermoplastic resin, and in the present specification "elastic modulus" means tensile elastic modulus, unless otherwise stated.

The acid-modified olefin-based thermoplastic resin with elastic modulus of 140 MPa or greater is also referred to as "specific acid-modified polyolefin", and the thermoplastic resin other than the specific acid-modified polyolefin having a content ratio in the first specific covering mixture of from 55% by mass to 95% by mass is also referred to as "specific thermoplastic resin" in the first tire of the invention.

From the viewpoint of durability of the tire, it is desirable for a metal reinforcing cord member to be sufficiently fixed to the tire frame when forming a tire employing the metal reinforcing cord member. From the viewpoint of the durability of the tire, it is preferable during forming the tire to prevent the occurrence of air (bubbles) remaining at the cord periphery, this being a cause of movement of the metal reinforcing cord member. Moreover, the material employed in the tire frame of a resin tire is preferably flexible from the viewpoint of ride quality in automobiles and the like. However, when a rigid member such as steel cord is employed as a metal reinforcing cord member, there is a large difference in elastic modulus between the flexible resin material and the metal reinforcing cord member (a rigidity difference), making it difficult to maintain sufficient adhesion durability between the tire frame and the metal reinforcing cord member.

If a thermoplastic resin in a molten state is placed in contact with a metal surface and allowed to harden in that state, then strong adhesion to the metal surface can be achieved, enabling an increase in the pull-out resistance of the first specific covering mixture with respect to the metal reinforcing cord member. Moreover, if the first specific covering mixture, including at least a specific acid-modified polyolefin and a specific thermoplastic resin, is present at the interface between the metal reinforcing cord member and the resin material forming the tire frame, the first specific covering mixture can act as an adhesion layer interposed between the metal reinforcing cord member and the tire frame.

This is thought to be because the first specific covering mixture contains at least two types of thermoplastic resin, and has excellent adhesiveness to a tire frame constituted by a resin material, and, due to the presence of the specific acid-modified polyolefin and the specific thermoplastic resin contained in the first specific covering mixture, the durability of the first specific covering mixture is raised, and there is excellent adhesiveness between the metal reinforcing cord member and the first specific covering mixture.

Moreover, the first specific covering mixture includes thermoplastic resin and has a smaller elastic modulus than the metal reinforcing cord member, and so the presence of the first specific covering mixture interposed between the metal reinforcing cord member and the tire frame enables the difference in elastic modulus (rigidity difference) between the resin material constituting the tire frame and the metal reinforcing cord member to be mitigated.

Accordingly, if the metal reinforcing cord member is covered by the first specific covering mixture, the pull-out resistance of the metal reinforcing cord member can be raised, and the adhesion durability between the reinforcing cord and the tire frame can be raised, due to mitigating the difference in elastic modulus (rigidity difference) between the tire frame and the metal reinforcing cord member, and due to the excellent adhesiveness between the tire frame and the metal reinforcing cord member.

"At least a portion of the metal reinforcing cord member is covered by the first specific covering mixture including at least an acid-modified olefin-based thermoplastic resin having an elastic modulus of 140 MPa or greater and a thermoplastic resin other than the acid-modified olefin-based thermoplastic resin at from 55% by mass to 95% by mass" means a state in which a portion, or all, of the surface of the metal reinforcing cord member is covered by the first specific covering mixture. Examples thereof include: a state in which the first specific covering mixture covers a portion, or all, of the outer circumference of the metal reinforcing cord member acting as a core; and a state in which a portion, or all, of the metal reinforcing cord member is embedded in the reinforcing cord covering layer when the reinforcing cord covering layer configured including the first specific covering mixture is provided at the outer circumference of the tire frame.

Configuration may be made such that at least a portion of the metal reinforcing cord member is embedded in the tire frame. For example, when the first specific covering mixture covers a portion, or all, of the outer circumference of the metal reinforcing cord member acting as a core, the contact area between the tire frame and the first specific covering mixture covering the metal reinforcing cord member can be increased by embedding the metal reinforcing cord member in the tire frame. Therefore the adhesion durability of the metal reinforcing cord member can be further raised. In cases in which a reinforcing cord covering layer constituted including the first specific covering mixture is provided at the outer circumference of the tire frame, a further increase in the adhesion durability of the reinforcing cord is enabled since the metal reinforcing cord member can be tightly fixed to the tire frame, and close contact and adhesion over a wide surface area can be made between the first specific covering mixture, acting as the reinforcing cord covering layer, and the tire frame, by embedding the metal reinforcing cord member in the tire frame surface.

The first tire of the invention preferably has the following configuration.

[1-1] A tire including a circular tire frame formed of a resin material, and a metal reinforcing cord member wound on the outer circumference of the tire frame, wherein at least a portion of the metal reinforcing cord member is covered by the first specific covering mixture including an acid-modified olefin-based thermoplastic resin having an elastic modulus of 140 MPa or greater (specific acid-modified polyolefin) and a thermoplastic resin other than the acid-modified olefin-based thermoplastic resin at from 55% by mass to 95% by mass (specific thermoplastic resin).

Strong adhesion to a metal surface can be achieved if a molten-state thermoplastic resin is placed in contact with the metal surface and allowed to harden in that state (the pull-out resistance of the first specific covering mixture with respect to the metal reinforcing cord member is increased). Employing two thermoplastic resins as components to configure a covering material of the metal reinforcing cord member enables the adhesiveness of the specific covering mixture that serves as the covering material of the metal reinforcing cord member to be raised in comparison to cases where only one specific thermoplastic resin is employed. In particular, employing an acid-modified olefin-based thermoplastic resin having an elastic modulus of 140 MPa or greater raises the adhesiveness of the first specific covering mixture, enabling the strength of the first specific covering mixture to be raised.

An elastic modulus of 140 MPa or greater is a numerical value to distinguish a thermoplastic resin, from a thermoplastic elastomer including a soft segment and a hard segment constituted by a thermoplastic resin from the viewpoint of elastic modulus. Namely, in the invention, out of polymer compounds that form thermoplastic resins and thermoplastic elastomers, a thermoplastic resin is a polymer compound having an elastic modulus of 140 MPa or greater, and a thermoplastic elastomer is a polymer compound having an elastic modulus of less than 140 MPa.

Moreover, out of olefin-based thermoplastic resins, employing an olefin-based thermoplastic resin that is an acid-modified product raises the affinity between the thermoplastic resins constituting the first specific covering mixture, and suppresses phase separation, enabling the durability of the first specific covering mixture to be raised.

Therefore, due to covering the metal reinforcing cord member with the first specific covering mixture having a higher elastic modulus than the resin material constituting the tire frame, the first specific covering mixture grips the metal reinforcing cord member strongly, enabling the adhesiveness between the first specific covering mixture and the metal reinforcing cord member to be raised.

In the tire of the invention, the tire frame is formed of a resin material, and so the adhesiveness between the first specific covering mixture and the tire frame are superior to cases in which the tire frame is formed of a rubber.

Accordingly, if the metal reinforcing cord member is covered by the first specific covering mixture, since the first specific covering mixture, interposed between the tire frame and the metal reinforcing cord member, has excellent adhesiveness to the tire frame and excellent adhesiveness to the metal reinforcing cord member, the pull-out resistance of the metal reinforcing cord member can be raised, and the adhesion durability between the reinforcing cord and the tire frame can be raised.

The first specific covering mixture can easily form a sea-island structure constituted by a sea phase including the specific thermoplastic resin, and an island phase including the specific acid-modified polyolefin, if the content ratio of the specific thermoplastic resin in the first specific covering mixture is from 55% by mass to 95% by mass.

In order to further improve the adhesiveness, surface treatment, surface activation, or coating with an adhesive may be performed on the metal reinforcing cord member.

The specific acid-modified polyolefin often has good adhesiveness to other resins. The degrees of freedom for selecting the resin material constituting the tire frame are accordingly high from the viewpoint of adhesiveness between the tire frame and the first specific covering mixture material.

Moreover, in the tire of the invention, due to forming the tire frame with a resin material, the need for a vulcanization process, that was an essential process for a conventional rubber-made tire, is obviated, enabling, for example, the tire frame to be formed by injection molding or the like. The manufacturing process is accordingly simplified, enabling productivity to be raised, by reducing time, reducing cost, or the like. Moreover, employing a resin material for the tire frame enables the structure of a tire to be simplified compared to a conventional rubber-made tire, and as a result enables a tire weight reduction to be achieved. This thereby enables improvement in abrasion resistance and durability of the tire to be achieved when formed into a tire frame.

[1-2] The tire of [1-1], wherein the tensile elastic modulus of the tire frame (x1), the tensile elastic modulus of the covering mixture (the first specific covering mixture) (x2), and the tensile elastic modulus of the metal reinforcing cord member (x3) satisfy the relationship x1<x2<x3.

In the tire of the invention, setting the tensile elastic modulus of the first specific covering mixture larger than the tensile elastic modulus of the tire frame and smaller than the tensile elastic modulus of the metal reinforcing cord member, enables the rigidity difference between the resin material constituting the tire frame and the metal reinforcing cord member to be effectively mitigated, and enables the adhesion durability to be raised. In particular, in the invention, including an acid-modified olefin-based thermoplastic resin in the covering mixture gives excellent affinity between thermoplastic resins constituting the covering mixture, and phase separation is unlikely to occur.

[1-3] The tire of [1-1] or [1-2], wherein the elongation at break of the tire frame (y1), the elongation at break of the covering mixture (the first specific covering mixture) (y2), and the elongation at break of the metal reinforcing cord member (y3) satisfy the relationship y3<y2<y1.

In the tire of the invention, setting the elongation at break of the first specific covering mixture larger than the elongation at break of the metal reinforcing cord member, and smaller than the elongation at break of the tire frame, enables the rigidity difference between the resin material constituting the tire frame and the metal reinforcing cord member to be effectively mitigated, and enables the adhesion durability to be raised. In particular, in the invention, including an acid-modified olefin-based thermoplastic resin in the covering mixture gives excellent affinity between thermoplastic resins constituting the covering mixture, and phase separation is unlikely to occur.

[1-4] The tire of any one of [1-1] to [1-3], wherein the acid-modified olefin-based thermoplastic resin (the specific acid-modified polyolefin) is an acid-modified product of an α-olefin-based thermoplastic resin including an olefin having 3 or more carbon atoms as a monomer.

In the tire of the invention, by using an acid-modified product of an α-olefin-based thermoplastic resin including an olefin having 3 or more carbon atoms as a monomer as the specific acid-modified polyolefin, the elastic modulus of the specific acid-modified polyolefin is easily made 140 MPa or greater, enabling the characteristics of the first specific covering mixture, such as the tensile elastic modulus and the elongation at break, and the pull-out resistance of the metal reinforcing cord member with respect to the first specific covering mixture, to be improved.

[1-5] The tire of any one of [1-1] to [1-4], wherein the acid value of the acid-modified olefin-based thermoplastic resin (the specific acid-modified polyolefin) is 0.1 mg-$CH_3ONa$/g or greater but less than 20.0 mg-$CH_3ONa$/g.

Employing the specific acid-modified polyolefin enables the affinity to be raised at the sea-island interface between the island phase of the specific acid-modified polyolefin and the sea phase of the specific thermoplastic resin, enabling the characteristics of the first specific covering mixture, such as the tensile strength and the elongation at break, and the pull-out resistance of the metal reinforcing cord member with respect to the first specific covering mixture, to be improved.

[1-6] The tire of any one of [1-1] to [1-5], wherein the covering mixture (the first specific covering mixture) further includes an olefin-based thermoplastic resin including an olefin having 3 or more carbon atoms as a monomer.

In the tire of the invention, the strength of the first specific covering mixture is raised by further including an olefin-based thermoplastic resin including an olefin having 3 or more carbon atoms as a monomer in the first specific covering mixture, enabling the characteristics of the first specific covering mixture, such as the tensile elastic modulus and the elongation at break, and the pull-out resistance of the metal reinforcing cord member with respect to the first specific covering mixture, to be improved.

[1-7] The tire of any one of [1-1] to [1-6], wherein the resin material forming the tire frame and the thermoplastic resin (the specific thermoplastic resin) other than the acid-modified olefin-based thermoplastic resin included in the covering mixture (the first specific covering mixture) are the same type of resin.

The adhesiveness between the tire frame and the first specific covering mixture can be further raised by using the same type of resin for the resin material forming the tire frame and the specific thermoplastic resin.

[1-8] The tire of any one of [1-1] to [1-7], wherein the thermoplastic resin contained in the covering mixture (the first specific covering mixture) is a polyamide-based thermoplastic resin.

Employing the polyamide-based thermoplastic resin as the specific thermoplastic resin constituting the first specific covering mixture enables the pull-out resistance to be further raised with respect to the metal reinforcing cord member.

[1-9] The tire of any one of [1-1] to [1-8], wherein the resin material forming the tire frame includes a polyamide-based thermoplastic elastomer.

A polyamide-based thermoplastic elastomer meets the performance requirements of a tire frame from viewpoints such as elastic modulus (flexibility) and strength, and so is an appropriate resin material, and often has good adhesiveness to thermoplastic resins. Accordingly, the degrees of freedom for selecting the material of the first specific covering mixture are high from the viewpoint of the adhesiveness between the tire frame in which a polyamide-based thermoplastic elastomer is employed as the resin material forming the tire frame, and the first specific covering mixture material.

The olefin-based thermoplastic resin of the second tire of the invention is at least one (meth)acrylic-based copolymer selected from 1) to 3) below.
1) an olefin-(meth)acrylic acid copolymer
2) an olefin-(meth)acrylate copolymer
3) a metal-crosslinked product of a copolymer represented by 1) or 2)

Namely, the second tire of the invention is a tire that includes a circular tire frame formed of a resin material, and a metal reinforcing cord member wound on the outer circumference of the tire frame, wherein at least a portion of the metal reinforcing cord member is covered by a covering mixture including at least a thermoplastic resin, and at least one (meth)acrylic-based copolymer selected from 1) to 3) above.

Hereafter, the thermoplastic resin, and at least one (meth)acrylic-based copolymer selected from the olefin-(meth)acrylic acid copolymer, the olefin-(meth)acrylate copolymer, and the metal-crosslinked product of the copolymer, are referred to as the "specific copolymer".

The olefin-(meth)acrylic acid copolymer is also referred to as the "specific acid copolymer". The olefin-(meth)acrylate copolymer is also referred to as the "specific ester copolymer".

In the present specification, (meth)acrylic acid means at least one of acrylic acid and methacrylic acid. (Meth)acrylate means at least one of an acrylate (acrylic acid ester) and the corresponding methacrylate (methacrylic acid ester). (Meth)acryloyl group means at least one of an acryloyl group and a methacryloyl group.

From the viewpoint of durability of the tire, it is desirable for the metal reinforcing cord member to be sufficiently fixed to the tire frame when forming a tire employing the metal reinforcing cord member. From the viewpoint of the durability of the tire, it is preferable during forming the tire to prevent the occurrence of air (bubbles) remaining at the cord periphery, this being a cause of movement of the metal reinforcing cord member. Moreover, the material employed in the tire frame of a resin tire is preferably flexible from the viewpoint of ride quality in an automobile or the like. However, when a rigid member such as steel cord is employed as a metal reinforcing cord member, there is a large difference in elastic modulus between the flexible resin material and the metal reinforcing cord member (rigidity difference), making it difficult to maintain sufficient adhesion durability between the tire frame and the metal reinforcing cord member.

If a thermoplastic resin in a molten state is placed in contact with a metal surface and allowed to harden in that state, then strong adhesion to the metal surface can be achieved, enabling an increase in the pull-out resistance of the covering mixture with respect to the metal reinforcing cord member. Moreover, the presence of a second specific covering mixture, including at least a thermoplastic resin and a specific copolymer, at the interface between the metal reinforcing cord member and the resin material forming the tire frame, enables the rigidity difference between the metal reinforcing cord member and the tire frame to be mitigated. In particular, properties of the second specific covering mixture, such as flexibility (tensile elastic modulus), and elongation at break, can be adjusted easily by adjusting the content ratio of the thermoplastic resin and the specific copolymer, enabling the flexibility to be more easily raised than when a single thermoplastic resin is employed.

Moreover, the second specific covering mixture has the thermoplastic resin and the specific copolymer as main components, and so adhesiveness is also excellent with respect to the tire frame in which a resin material is employed. Thus, covering the metal reinforcing cord member with the second specific covering mixture raises the pull-out resistance of the metal reinforcing cord member and the adhesiveness to the tire frame while effectively mitigating the rigidity difference between the resin material constituting the tire frame and the metal reinforcing cord member, enabling an increase in the adhesion durability between the metal reinforcing cord member and the tire frame. In particular, when a specific acidic copolymer is employed as the specific copolymer, there is excellent affinity between the thermoplastic resin and the specific copolymer constituting the second specific covering mixture due to the presence of the acidic groups in the specific acid copolymer, and phase separation does not readily occur in the second specific covering mixture.

"At least a portion of the metal reinforcing cord member is covered by a covering mixture (the second specific covering mixture) including at least a thermoplastic resin and at least one (meth)acrylic-based copolymer selected from 1) to 3)" means a state in which a portion, or all, of the surface of the metal reinforcing cord member is covered by the second specific covering mixture. Examples thereof include: a state in which the second specific covering mixture covers a portion, or all, of the outer circumference of the metal reinforcing cord member acting as a core; and a state in which a portion, or all, of the metal reinforcing cord member is embedded in the reinforcing cord covering layer when the reinforcing cord covering layer configured including the second specific covering mixture is provided at the outer circumference of the tire frame.

Configuration may be made such that at least a portion of the metal reinforcing cord member is embedded in the tire frame. For example, when the second specific covering mixture covers a portion, or all, of the outer circumference of the metal reinforcing cord member acting as a core, the contact area between the tire frame, and the second specific covering mixture covering the metal reinforcing cord member can be increased if the metal reinforcing cord member is embedded in the tire frame. Therefore the adhesion durability of the metal reinforcing cord member can be further raised. In cases in which a reinforcing cord covering layer constituted including the second specific covering mixture is provided at the outer circumference of the tire frame, a further increase in the adhesion durability of the reinforcing cord is enabled since the metal reinforcing cord member can be tightly fixed to the tire frame, and close contact and adhesion over a wide surface area can be made between the second specific covering mixture, acting as the reinforcing cord covering layer, and the tire frame, by embedding the metal reinforcing cord member in the tire frame surface.

Preferably the second tire of the invention has the following configuration. [2-1] A tire including circular tire frame formed of a resin material, and a metal reinforcing cord member wound on the outer circumference of the tire frame, wherein at least a portion of the metal reinforcing cord member is covered by a covering mixture including at least a thermoplastic resin and at least one (meth)acrylic-based copolymer selected from 1) to 3) below:

1) an olefin-(meth)acrylic acid copolymer,
2) an olefin-(meth)acrylate copolymer, and
3) a metal-crosslinked product of the copolymer represented by 1) or 2).

If the thermoplastic resin in a molten state is placed in contact with a metal surface and allowed to harden in that state, then strong adhesion to the metal surface can be achieved (raising the pull-out resistance of the covering mixture to the metal reinforcing cord member). Moreover, the second specific covering mixture being present at the interface between the metal reinforcing cord member and the resin material forming the tire frame enables the rigidity difference between the metal reinforcing cord member and the tire frame to be mitigated. In particular, the properties of the second specific covering mixture, such as the flexibility (tensile elastic modulus), and elongation at break, can be adjusted easily by adjusting the content ratio of the thermoplastic resin and the specific copolymer, enabling the flexibility to be more easily raised than when a single thermoplastic resin is employed. Thus, covering the metal reinforcing cord member with the second specific covering mixture enables the pull-out resistance of the metal reinforcing cord member to be raised, while effectively mitigating the rigidity difference between the resin material constituting the tire frame and the metal reinforcing cord member, enabling the adhesion durability to be raised between the reinforcing cord and the tire frame.

The specific copolymer has excellent flexibility, and often has excellent adhesiveness to structures in which other resin materials, such as thermoplastic resins, are employed. In addition, the metal-crosslinked product of an olefin-(meth)acrylic acid copolymer or an olefin-(meth)acrylate copolymer, also called an ionomer, has excellent durability, and enables the durability of the second specific covering mixture to be raised. In particular, a specific acid copolymer having an acid group raises the affinity between the thermoplastic resin and the specific copolymer constituting the second specific covering mixture, and phase separation between the thermoplastic resin and the specific copolymer does not readily occur, enabling a fracture state of ductile fracturing to be achieved even in a supposed case of the second specific covering mixture fracturing.

Accordingly, the degrees of freedom for selecting the resin material to constitute the tire frame are high from the viewpoint of the adhesiveness between the tire frame and the second specific covering mixture material.

Moreover, in the tire of the invention, due to forming the tire frame with a resin material, the need for a vulcanization process, that was an essential process for a conventional rubber-made tire, is obviated, enabling, for example, the tire frame to be formed by injection molding or the like. The manufacturing process is accordingly simplified, enabling productivity to be raised, such as by reducing time or reducing cost. Moreover, employing a resin material for the tire frame enables the structure of a tire to be simplified compared to a conventional rubber-made tire, and as a result enables a tire weight reduction to be achieved. This thereby enables improvement in abrasion resistance and durability of the tire to be achieved when formed into a tire frame.

[2-2] The tire of [2-1] wherein the covering mixture (the second specific covering mixture) has a sea-island structure including a sea phase including the thermoplastic resin, and an island phase including the (meth)acrylic-based copolymer (the specific copolymer).

In the tire of the invention, the second specific covering mixture having a sea-island structure in which the specific copolymer is dispersed in a matrix of the thermoplastic resin enables an increase in characteristics of the covering mixture, such as the elastic modulus and the elongation at break, and the pull-out resistance of the metal reinforcing cord member with respect to the covering mixture.

[2-3] The tire of [2-1] or [2-2] wherein a mass ratio (p/e) of the thermoplastic resin (p) and the (meth)acrylic-based copolymer (specific copolymer) (e) in the covering mixture (the second specific covering mixture) is from 95/5 to 55/45.

Setting the mass ratio of the thermoplastic resin and the specific copolymer in this range enables a sea-island structure of a sea phase including the thermoplastic resin and an island phase including the specific copolymer to be easily formed.

[2-4] The tire of any one of [2-1] to [2-3] wherein the tensile elastic modulus of the tire frame ($x1$), the tensile elastic modulus of the covering mixture (the second specific covering mixture) ($x2$), and the tensile elastic modulus of the metal reinforcing cord member ($x3$) satisfy the relationship $x1 < x2 < x3$.

In the tire of the invention, setting the tensile elastic modulus of the covering mixture greater than the tensile elastic modulus of the tire frame and less than the tensile elastic modulus of the metal reinforcing cord member, effectively mitigates the rigidity difference between the resin material constituting the tire frame and the metal reinforcing cord member, enabling the adhesion durability to be raised.

[2-5] The tire of any one of [2-1] to [2-4] wherein the elongation at break of the tire frame (y1), the elongation at break of the covering mixture (the second specific covering mixture) (y2), and the elongation at break of the metal reinforcing cord member (y3) satisfy the relationship $y3<y2<y1$.

In the tire of the invention, setting the elongation at break of the covering mixture greater than the elongation at break of the metal reinforcing cord member and less than the elongation at break of the tire frame, effectively mitigates the rigidity difference between the resin material constituting the tire frame and the metal reinforcing cord member, enabling the adhesion durability to be raised.

[2-6] The tire of any one of [2-1] to [2-5] wherein the resin material forming the tire frame and the thermoplastic resin included in the covering mixture (the second specific covering mixture) include the same type of resin.

In the tire of the invention, the adhesiveness between the tire frame and the second specific covering mixture can be further raised by employing the same type of resin for the resin configuring the resin material forming the tire frame and the thermoplastic resin of the second specific covering mixture.

[2-7] The tire of any one of [2-1] to [2-6] wherein the thermoplastic resin included in the covering mixture (the second specific covering mixture) is a polyamide-based thermoplastic resin.

Employing a polyamide-based thermoplastic resin as the thermoplastic resin constituting the second specific covering mixture enables the pull-out resistance with respect to the metal reinforcing cord member to be further raised.

[2-8] The tire of any one of [2-1] to [2-7] wherein the resin material forming the tire frame includes a polyamide-based thermoplastic elastomer.

A polyamide-based thermoplastic elastomer is an excellent resin material to satisfy the properties required of a tire frame from such viewpoints as elastic modulus (flexibility) and strength, and also often has good adhesiveness to thermoplastic resins. Accordingly, employing a polyamide-based thermoplastic elastomer as the resin material forming the tire frame tends to raise the degrees of freedom for selecting the material of the second specific covering mixture from the viewpoint of adhesiveness between the tire frame and the second specific covering mixture material.

Explanation next follows regarding the metal reinforcing cord member in the invention, and also the first specific covering mixture and the second specific covering mixture for covering the metal reinforcing cord member, and the resin material forming the tire frame, followed by explanation regarding specific embodiments of tires of the invention, with reference to the drawings.

In the present specification, the concept of "resin" includes thermoplastic resins and thermoset resins, but does not include natural rubber.

Metal Reinforcing Cord Member

A metal cord, or the like, employed in conventional rubber-made tires may be suitably employed as the metal reinforcing cord member. Examples that may be employed as the metal reinforcing cord member include a monofilament (single strand) metal fiber, or a multifilament (twisted strands) of twisted fibers, such as a steel cord of twisted steel fibers. There is no particular limitation to the cross-sectional profile, size (diameter), or the like, of the metal reinforcing cord member, and these may be appropriately selected and employed as appropriate to the desired tire.

A single strand, or plural strands, of the metal reinforcing cord member may be wound onto the tire frame in a circumferential direction, and may be wound in a continuous helical shape continuously along the circumferential direction. The metal reinforcing cord member may be wound in the circumferential direction so as to be evenly spaced along the width direction of the tire frame, or may be wound so as to cross over itself.

The elastic modulus of the metal reinforcing cord member itself is normally from approximately 100000 MPa to approximately 300000 MPa, preferably from 120000 MPa to 270000 MPa, and more preferably from 150000 MPa to 250000 MPa.

Note that the elastic modulus of the metal reinforcing cord member itself may be computed from the gradient of a stress-strain curve plotted using a ZWICK-type chuck in a tensile test machine.

The elongation at break (tensile elongation at break) of the metal reinforcing cord member itself is normally from approximately 0.1% to approximately 15%, is preferably from 1% to 15%, and is more preferably from 1% to 10%.

The tensile elongation at break of the metal reinforcing cord member itself is derived from the strain by plotting a stress-strain curve using ZWICK-type chuck in a tensile test machine.

First Specific Covering Mixture

The first specific covering mixture covering the metal reinforcing cord member includes at least an acid-modified olefin-based thermoplastic resin (specific acid-modified polyolefin) having an elastic modulus of 140 MPa or greater, and the thermoplastic resin (the specific thermoplastic resin) other than the acid-modified olefin-based thermoplastic resin at from 55% by mass to 95% by mass.

In the first specific covering mixture, adjusting the content ratio of the specific acid-modified polyolefin and the specific thermoplastic resin while adjusting the content ratio of the specific thermoplastic resin in the first specific covering mixture within the above range enables characteristics such as the flexibility (the elastic modulus) and the elongation at break of the first specific covering mixture to be easily adjusted, and in particular enables a higher flexibility to be achieved than in cases in which a single thermoplastic resin is employed.

It is sufficient that at least a portion of the metal reinforcing cord member be covered by the first specific covering mixture, and as stated above, a state in which the first specific covering mixture covers a portion, or all, of the outer circumference of the metal reinforcing cord member acting as a core, and a state in which a portion, or all, of the metal reinforcing cord member is embedded in the reinforcing cord covering layer when the reinforcing cord covering layer constituted including the first specific covering mixture is provided at the outer circumference of the tire frame are sufficient. It is preferable that all the locations at the interface between the metal reinforcing cord member and the tire frame be covered by the first specific covering mixture, and more preferably the entire surface of the metal reinforcing cord member is covered by the first specific covering mixture.

There are no particular limitations to the method for covering the metal reinforcing cord member with the first specific covering mixture, and a known cord covering method or the like may be employed as appropriate. For example, in cases in which the first specific covering mixture covers a portion, or all, of the outer circumference of the metal reinforcing cord member acting as a core, a method may be employed in which a steel cord is covered by molten-state thermoplastic resin using a known cross-head extruder. Moreover, when forming a reinforcing cord covering layer, a steel cord may be embedded in a molten-state reinforcing cord covering layer, or a reinforcing cord covering layer may be formed after winding a steel cord onto a tire frame. Moreover, a method in which, after a steel cord has been embedded in a molten-state reinforcing cord covering layer, a molten-state first specific covering mixture, including at least the specific thermoplastic resin and the specific acid-modified polyolefin, is further layered thereon thus completely embedding the steel cord in the steel cord covering layer, or the like, may be employed.

From the viewpoint of effectively mitigating the rigidity difference between the metal reinforcing cord member and the tire frame, the elastic modulus of the covering mixture itself is preferably set in a range of from 0.1 times to 20 times, more preferably set in the range of from 0.2 times to 10 times, and particularly preferably set in the range of from 0.5 times to 5 times the elastic modulus of the resin material forming the tire frame. When the elastic modulus of the covering mixture is 10 times the elastic modulus of the thermoplastic resin material forming the tire frame or lower, the rigidity difference is mitigated, and in addition, the crown portion is made not too hard and fitting onto a rim is easily achieved. When the elastic modulus of the covering mixture is 0.1 times the elastic modulus of the thermoplastic resin material forming the tire frame or greater, the covering mixture is not too soft, and a tire with excellent belt in-plane shear stiffness and raised cornering force is achieved.

From the viewpoint of effectively mitigating the rigidity difference between the tire frame and the metal reinforcing cord member, the elastic modulus the first specific covering mixture itself is preferably set higher than the elastic modulus of the tire frame, and lower than the elastic modulus of the metal reinforcing cord member.

The tensile elastic modulus as defined by JIS K7113:1995 of the first specific covering mixture itself is normally from approximately 50 MPa to approximately 2000 MPa, is preferably from 50 MPa to 1700 MPa, and is more preferably from 50 MPa to 1600 MPa.

Regarding the tensile elastic modulus of the first specific covering mixture itself, from the viewpoints of effectively mitigating the rigidity difference between the resin material forming the tire frame and the metal reinforcing cord member and raising the adhesion durability, the tensile elastic modulus of the tire frame (x1), the tensile elastic modulus of the first specific covering mixture (x2), and the tensile elastic modulus of the metal reinforcing cord member (x3), preferably satisfy the relationship $x1<x2<x3$.

The elongation at break (tensile elongation at break) as defined by JIS K7113:1995 of the first specific covering mixture itself is normally from approximately 10% to approximately 600%, is preferably from 10% to 500%, and is more preferably from 10% to 300%.

Regarding the elongation at break of the first specific covering mixture itself, from the viewpoints of effectively mitigating the rigidity difference between the resin material forming the tire frame and the metal reinforcing cord member and raising the adhesion durability, the elongation at break of the tire frame (y1), the elongation at break of the first specific covering mixture (y2), and the elongation at break of the metal reinforcing cord member (y3) preferably satisfy the relationship $y3<y2<y1$.

Specific Thermoplastic Resin

It is sufficient that the specific thermoplastic resin included in the first specific covering mixture be a thermoplastic resin other than the specific acid-modified polyolefin, and the specific thermoplastic resin is otherwise not particularly limited, with appropriate examples thereof including polymers constituting the hard segment of thermoplastic resins employed in the tire frame, described below. Examples of such thermoplastic resins include urethane-based resins, olefin-based resins, vinyl chloride-based resins, polyamide-based resins, polyester-based resins, and polystyrene-based resins, with polyamide-based resins being particularly preferable. Employing a polyamide-based thermoplastic resin as the thermoplastic resin of the first specific covering mixture enables the pull-out resistance with respect to the metal reinforcing cord member to be further improved.

The specific thermoplastic resin included in the first specific covering mixture is preferably selected in consideration of the adhesiveness to the resin material employed in the tire frame. In particular, employing the same type of resin for the resin material forming the tire frame and for the specific thermoplastic resin included in the first specific covering mixture enables the adhesiveness between the tire frame and the first specific covering mixture to be further raised. For example, in cases in which a polyamide-based thermoplastic resin is employed as the specific thermoplastic resin included in the first specific covering mixture, a polyamide-based thermoplastic elastomer is preferably employed in the tire frame.

"Thermoplastic elastomer" means a thermoplastic resin material constituted by a copolymer including a polymer constituting a hard segment that is crystalline and has a high melting point or a hard segment that has a high cohesive force, and including a polymer constituting a soft segment that is amorphous and has a low glass transition temperature.

The tensile elastic modulus as defined by JIS K7113:1995 of the specific thermoplastic resin itself, included in the first specific covering mixture, is preferably from 50 MPa to 2000 MPa, is more preferably from 70 MPa to 1700 MPa, and is particularly preferably from 100 MPa to 1600 MPa.

Explanation next follows regarding examples of polyamide-based thermoplastic resins as the specific thermoplastic resin included in the first specific covering mixture of the invention; however, the invention is not limited thereto.

Polyamide-Based Thermoplastic Resin

Examples of the polyamide-based thermoplastic resin include polyamides that constitute the hard segment of the polyamide-based thermoplastic elastomers described later. Examples of the polyamide-based thermoplastic resin include polyamides (amide 6) that are ring-opened polycondensates of ε-caprolactam, polyamides (amide 11) that are ring-opened polycondensates of undecane lactam, polyamides (amide 12) that are ring-opened polycondensates of lauryl lactam, polyamides (amide 66) that are polycondensates of a diamine and a dibasic acid, and polyamides (amide MX) having meta-xylene diamine as a structural unit.

The amide 6 may be represented by, for example, $\{CO-(CH_2)_5-NH\}_n$. The amide 11 may be represented by, for example, $\{CO-(CH_2)_{10}-NH\}_n$. The amide 12 may be represented by, for example, $\{CO-(CH_2)_{11}-NH\}_n$. The amide 66 may be represented by, for example, $\{CO(CH_2)_4 CONH(CH_2)_6NH\}_n$. An amide MX having meta-xylene diamine as a structural unit may, for example, be expressed by the Formula below. As the amide 6, for example, a commercial product such as "UBE Nylon" 1022B or 1011FB, manufactured by Ube Industries, Ltd., may be used. As the amide 11, Rilsan B or the like, manufactured by Alchema Co., Ltd. may be employed. As the amide 12, "UBE Nylon", for example 3024U, 3020U, 3014U, manufactured by Ube Industries, Ltd., may be used. As the amide 66, "UBE Nylon", for example 2020B and 2015B, may be used. Moreover, as the amide MX, for example, a commercial product, such as MX Nylon (S6001, S6021, or S6011), manufactured by Mitsubishi Gas Chemical Company, Inc., may be used.

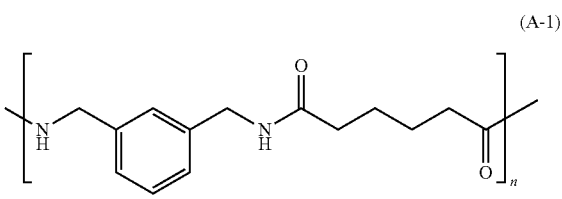

(A-1)

The polyamide-based thermoplastic resin may be a homopolymer configured only by each of the structural units, or may be a copolymer of the structural unit (A-1) (wherein n represents the number of repeating units in A-1) and another monomer. In the case of a copolymer, the content ratio of each of the structural units in each polyamide-based thermoplastic resin is preferably 40% by mass or above.

From the viewpoint of raising the elastic modulus of the first specific covering mixture, the number average molecular weight of the polyamide-based thermoplastic resin is preferably from 300 to 30000. Moreover, from the viewpoint of toughness and flexibility at low temperature, the number average molecular weight of the polymer constituting the soft segment is preferably from 200 to 20000.

Acid-Modified Olefin-Based Thermoplastic Resin Having an Elastic Modulus of 140 MPa or Greater (Specific Acid-Modified Polyolefin)

The first specific covering mixture includes an acid-modified olefin-based thermoplastic resin having an elastic modulus of 140 MPa or greater (the specific acid-modified polyolefin).

An acid-modified olefin-based thermoplastic resin refers to an acid-modified product in which an olefin-based thermoplastic resin has been acid-modified with an acid group such as a carboxylic acid group, a sulfuric acid group, or a phosphoric acid group. Acid-modification of an olefin-based thermoplastic resin may be carried out by introducing an acid group into an olefin-based thermoplastic resin by using a compound having an acid group. From the viewpoint of suppressing degradation of the olefin-based thermoplastic resin, the compound having an acid group employed to acid-modify the olefin-based thermoplastic resin is preferably an unsaturated compound having a carboxylic acid group that is a weak acid group, and examples thereof include acrylic acid, methacrylic acid, itaconic acid, crotonic acid, isocrotonic acid, and maleic acid.

Examples of the olefin-based thermoplastic resin to be acid-modified include olefin-α-olefin random copolymers, and olefin block copolymers, for example, propylene block copolymers, ethylene-propylene copolymers, propylene-1-hexene copolymers, propylene-4-methyl-1-pentene copolymers, propylene-1-butene copolymers, ethylene-1-hexene copolymers, ethylene-4-methyl-pentene copolymers, ethylene-1-butene copolymers, 1-butene-1-hexene copolymers, 1-butene-4-methyl-pentene copolymers, ethylene-methacrylic acid copolymers, ethylene-methyl methacrylate copolymers, ethylene-ethyl methacrylate copolymer, ethylene-butyl methacrylate copolymer, ethylene-methyl acrylate copolymer, ethylene-ethyl acrylate copolymer, ethylene-butyl acrylate copolymer, propylene-methacrylic acid copolymer, propylene-methyl methacrylate copolymer, propylene-ethyl methacrylate copolymer, propylene-butyl methacrylate copolymer, propylene-methyl acrylate copolymer, propylene-ethyl acrylate copolymer, propylene-butyl acrylate copolymer, ethylene-vinyl acetate copolymer, propylene-vinyl acetate copolymer, and the like.

The specific acid-modified polyolefin has an elastic modulus of 140 MPa or greater, and from this viewpoint the specific acid-modified polyolefin preferably is an acid-modified product of an α-olefin-based thermoplastic resin including an olefin having 3 or more carbon atoms as a monomer.

Examples of the α-olefin-based thermoplastic resin including an olefin having 3 or more carbon atoms as a monomer include α-olefin-based thermoplastic resins including only a repeating unit including an olefin having 3 or more carbon atoms as a monomer (olefin homopolymers), and α-olefin-based thermoplastic resins including a repeating unit including an olefin having 3 or more carbon atoms as a monomer and another repeating unit (olefin copolymers).

Examples of α-olefin-based thermoplastic resins including only a repeating unit including an olefin having three or more carbon atoms as a monomer (olefin homopolymers) include homopolymers of propylene, butene, or the like.

Examples of α-olefin-based thermoplastic resins including a repeating unit including an olefin having three or more carbon atoms as a monomer and another repeating unit (olefin copolymers) include propylene block copolymers, ethylene-propylene copolymers, propylene-1-hexene copolymers, propylene-4-methyl-1-pentene copolymers, propylene-1-butene copolymers, ethylene-1-hexene copolymers, ethylene-4-methyl-pentene copolymers, ethylene-1-butene copolymers, 1-butene-1-hexene copolymers, 1-butene-4-methyl-pentene copolymers, propylene-methacrylic acid copolymers, propylene-methyl methacrylate copolymers, propylene-ethyl methacrylate copolymers, propylene-butyl methacrylate copolymers, propylene-methyl acrylate copolymers, propylene-ethyl acrylate copolymers, propylene-butyl acrylate copolymers, and propylene-vinyl acetate copolymer.

Of these, α-olefin-based thermoplastic resins including only a repeating unit including an olefin having three or more carbon atoms as a monomer (olefin homopolymers) are preferable.

The acid value of the specific acid-modified polyolefin is one that exceeds 0 mg-$CH_3ONa$/g.

"The acid value of the specific acid-modified polyolefin" refers to total mass of sodium methoxide ($CH_3ONa$) required to neutralize the acid-modified sites of the specific acid-modified polyolefin with respect to the total mass of the specific acid-modified polyolefin. In cases in which the specific acid-modified polyolefin included in the first specific covering mixture is a single type, then the acid value is computed from the following Equation (1), and in cases in which two or more types of the specific acid-modified polyolefin are included in the first specific covering mixture, the acid value is computed from the following Equation (2).

[(acid value of the specific acid-modified polyolefin $A$)×(total mass of the specific acid-modified polyolefin $A$)]/(total mass of the specific acid-modified polyolefin $A$)     Equation (1)

[(acid value of the specific acid-modified polyolefin $A$)×(total mass of the specific acid-modified polyolefin $A$)+(acid value of the specific acid-modified polyolefin $B$)×(total mass of the specific acid-modified polyolefin $B$) . . . ]/(total mass of the specific acid-modified polyolefins in the first specific covering mixture)  Equation (2)

The acid value of the specific acid-modified polyolefin A in Equation (1), and the acid values of the specific acid-modified polyolefins A, B, . . . in Equation (2) above are determined by the mass (mg) of sodium methoxide ($CH_3ONa$) used to perform neutralization titration using sodium methoxide ($CH_3ONa$) for 1 g of each specific acid-modified polyolefin.

Hereafter, the units of acid value of each specific acid-modified polyolefin are also denoted by (mg($CH_3ONa$)/g).

From the viewpoint of injection moldability of the thermoplastic resin material, the acid value of the thermoplastic resin material is preferably 0.1 mg-$CH_3ONa$/g or greater but less than 20.0 mg-$CH_3ONa$/g, more preferably from 0.1 mg-$CH_3ONa$/g to 17.0 mg-$CH_3ONa$/g, and still more preferably from 0.1 mg-$CH_3ONa$/g to 15.0 mg-$CH_3ONa$/g.

The first specific covering mixture has a sea-island structure including a sea phase that is a matrix phase formed of the specific thermoplastic resin, and an island phase that is a dispersed phase formed of the specific acid-modified polyolefin. The flowability of the first specific covering mixture increases when there is weak interaction at the interface between the sea phase and the island phase, giving excellent injection molding properties. The specific acid-modified polyolefin includes acid-modified sites within the molecule and so has stronger interaction with the specific thermoplastic resin than non-acid-modified thermoplastic resins.

In the sea-island structure, there is a tendency for the island phase to be smaller as the acid value of the specific acid-modified polyolefin becomes higher, and for the island phase to be larger as the acid value becomes lower. The island phase is finely dispersed in the specific thermoplastic resin due to the acid value of the specific acid-modified polyolefin being within the above range, raising the impact resistance properties of the first specific covering mixture in particular. Moreover, the melt viscosity of the first specific covering mixture is not increased excessively, and the first specific covering mixture has excellent injection molding properties. Accordingly, since heating the first specific covering mixture to a high temperature is not required when covering the metal reinforcing cord member using the first specific covering mixture, damage due to excessive heating of the first specific covering mixture is suppressed.

Fine dispersion of the island phase of the specific acid-modified polyolefin in the specific thermoplastic resin may be confirmed by inspecting images obtained using a scanning electron microscope (SEM).

The elastic modulus of the specific acid-modified polyolefin being 140 MPa or greater means the tensile elastic modulus as defined by JIS K7113:1995 of the specific acid-modified polyolefin being 140 MPa or greater.

From the viewpoints of the strength of the first specific covering mixture and the adhesiveness between the first specific covering mixture and the metal reinforcing cord member, the elastic modulus of the specific acid-modified polyolefin is preferably from 140 MPa to 2,000 MPa, is more preferably from 140 MPa to 1700 MPa, and is particularly preferably from 140 MPa to 1500 MPa.

The number average molecular weight of the specific acid-modified polyolefin is preferably from 5,000 to 10,000,000. If number average molecular weight of the specific acid-modified polyolefin is from 5,000 to 10,000,000, an elastic modulus of the specific acid-modified polyolefin of 140 MPa or greater is easily achievable, mechanical physical properties are sufficient, and workability is excellent. From these viewpoints, the number average molecular weight is more preferably from 7,000 to 1,000,000, and is particularly preferably from 10,000 to 1,000,000.

Unmodified Olefin-Based Thermoplastic Resin Including an Olefin Having 3 or More Carbon Atoms as a Monomer The first specific covering mixture may, in addition to the specific thermoplastic resin and the specific acid-modified polyolefin, also include an unmodified olefin-based thermoplastic resin including an olefin having 3 or more carbon atoms as a monomer (referred to below as "specific unmodified polyolefin"). Note that when the first specific covering mixture includes a specific unmodified polyolefin, the specific thermoplastic resin is a resin other than the specific unmodified polyolefin. Namely, when the first specific covering mixture includes the specific unmodified polyolefin other than the specific thermoplastic resin, the first specific covering mixture is a multi-component system resin composition including at least a 3 component system resin.

The specific unmodified polyolefin has a low elastic modulus and high strength, and therefore by including the specific unmodified polyolefin in the first specific covering mixture, the first specific covering mixture is imparted with flexibility, and strength is raised, enabling the adhesiveness between the first specific covering mixture and the metal reinforcing cord member to be raised.

Examples of the specific unmodified polyolefin include an α-olefin-based thermoplastic resin including an olefin having 3 or more carbon atoms as a monomer, which is already described as an olefin-based thermoplastic resin to be acid-modified to obtain the specific acid-modified polyolefin, or a composition of rubber and the α-olefin resin (in which the rubber may be crosslinked). Specific examples of the α-olefin-based thermoplastic resin including an olefin having 3 or more carbon atoms as a monomer include the examples given above, and preferable embodiments thereof are similar.

Content of the Specific Thermoplastic Resin and the Specific Acid-Modified Polyolefin in the First Specific Covering Mixture In the first specific covering mixture, the content of the specific thermoplastic resin is from 55% by mass to 95% by mass with respect to the total mass of the first specific covering mixture. Consequently, the specific acid-modified polyolefin is included in the first specific covering mixture in a range of from 5% by mass to 45% by mass. When the first specific covering mixture contains the specific unmodified polyolefin as well as the specific thermoplastic resin and the specific acid-modified polyolefin, the sum of the specific acid-modified polyolefin and the specific unmodified polyolefin is from 5% by mass to 45% by mass.

In this manner, the specific thermoplastic resin constitutes the majority of the first specific covering mixture and forms the matrix phase (sea phase), and the specific acid-modified polyolefin and the specific unmodified polyolefin are included in the first specific covering mixture as the island phase.

The content of the specific thermoplastic resin is preferably from 50% by mass to 95% by mass, and is more preferably from 60% by mass to 90% by mass with respect to the total mass of the first specific covering mixture.

When the first specific covering mixture does not include a specific unmodified polyolefin, from the viewpoint of raising the affinity to the specific thermoplastic resin in the first specific covering mixture, and of raising the durability of the first specific covering mixture, the content of the specific acid-modified polyolefin is preferably from 5% by mass to 45% by mass, and is more preferably from 10% by mass to 40% by mass with respect to the total mass of the first specific covering mixture.

When the first specific covering mixture includes the specific unmodified polyolefin, from the viewpoint of raising the affinity of each thermoplastic resin in the first specific covering mixture and raising the durability of the first specific covering mixture, the content of the specific acid-modified polyolefin is preferably from 5% by mass to 40% by mass, and is more preferably from 10% by mass to 35% by mass with respect to the total mass of the first specific covering mixture.

From the viewpoint of raising the strength of the first specific covering mixture, when the first specific covering mixture contains a specific unmodified polyolefin, the content of the specific unmodified polyolefin is preferably from 5% by mass to 40% by mass, and is more preferably from 10% by mass to 35% by mass with respect to the total mass of the first specific covering mixture.

As stated above, an embodiment is preferable in which the first specific covering mixture has a sea-island structure including a sea phase that is the matrix phase constituted by the specific thermoplastic resin, and an island phase that is a dispersed phase constituted by the specific acid-modified polyolefin, or an island phase that is a dispersed phase constituted by the specific acid-modified polyolefin and the specific unmodified polyolefin. Due to the first specific covering mixture having a sea-island structure in which the specific acid-modified polyolefin and the like are dispersed in the matrix of the specific thermoplastic resin, an improvement is enabled in properties such as the elongation at break of the first specific covering mixture, and the pull-out resistance of the metal reinforcing cord member with respect to the first specific covering mixture.

The size (long axis of the island phase) of the island phase including the specific acid-modified polyolefin and the like is preferably from approximately 0.4 μm to approximately 10.0 μm, more preferably from approximately 0.5 μm to approximately 7 μm, and particularly preferably from approximately 0.5 μm to approximately 5 μm. The size of each phase may be measured by inspecting images obtained using a scanning electron microscope (SEM).

Second Specific Covering Mixture

A second specific covering mixture that covers the metal reinforcing cord member includes a thermoplastic resin and at least one (meth)acrylic-based copolymer selected from 1) to 3) below:
1) an olefin-(meth)acrylic acid copolymer (specific acid copolymer),
2) an olefin-(meth)acrylate copolymer (specific ester copolymer), and
3) a metal-crosslinked product of the copolymer represented by 1) or 2).

In the second specific covering mixture, characteristics such as the flexibility (elastic modulus) and elongation at break of the covering mixture can be easily adjusted by adjusting the content ratio of the specific copolymer and the thermoplastic resin while adjusting the content ratio of the thermoplastic resin in the second specific covering mixture within the above range, enabling a higher flexibility to be achieved than in cases in which, in particular, a single thermoplastic resin is employed.

It is sufficient that at least a portion of the metal reinforcing cord member be covered by the second specific covering mixture, and as stated above, a state in which the second specific covering mixture covers a portion, or all, of the outer circumference of the metal reinforcing cord member acting as a core, and a state in which a portion, or all, of the metal reinforcing cord member is embedded in the reinforcing cord covering layer when the reinforcing cord covering layer constituted including the second specific covering mixture is provided at the outer circumference of the tire frame are sufficient. It is preferable that all the locations at the interface between the metal reinforcing cord member and the tire frame be covered by the second specific covering mixture, and more preferably the entire surface of the metal reinforcing cord member is covered by the second specific covering mixture.

There are no particular limitations to the method for covering the metal reinforcing cord member with the second specific covering mixture, and a known cord covering method or the like may be employed as appropriate. For example, in cases in which the second specific covering mixture covers a portion, or all, of the outer circumference of the metal reinforcing cord member acting as a core, a method may be employed in which a steel cord is covered by molten-state thermoplastic resin using a known crosshead extruder. Moreover, when forming a reinforcing cord covering layer, a steel cord may be embedded in a molten-state reinforcing cord covering layer, or a reinforcing cord covering layer may be formed after winding a steel cord onto a tire frame. Moreover, a method in which, after a steel cord has been embedded in a molten-state reinforcing cord covering layer, a molten-state second specific covering mixture, including at least the specific thermoplastic resin and the specific acid-modified elastomer, is further layered thereon thus completely embedding the steel cord in the steel cord covering layer, or the like, may be employed.

From the viewpoint of effectively suppressing the rigidity difference between the tire frame and the metal reinforcing cord member, the tensile elastic modulus as defined by JIS K7113:1995 of the second specific covering mixture itself is preferably from 50 MPa to 2000 MPa, is more preferably from 50 MPa to 1700 MPa, and is particularly preferably from 50 MPa to 1600 MPa.

From the viewpoint of effectively mitigating the rigidity difference between the metal reinforcing cord member and the tire frame, the elastic modulus of the second specific covering mixture itself is preferably set in a range of from 0.1 times to 20 times, more preferably set in the range of from 0.2 times to 10 times, and particularly preferably set in the range of from 0.5 times to 5 times the elastic modulus of the resin material forming the tire frame. When the elastic modulus of the second specific covering mixture is 20 times the elastic modulus of the thermoplastic resin material forming the tire frame or lower, the rigidity difference is mitigated, and in addition, the crown portion does not become too hard and fitting onto a rim is easily achieved. When the elastic modulus of the covering mixture is 0.1 times the elastic modulus of the thermoplastic resin material forming the tire frame or greater, the covering mixture is not too soft, and a tire with excellent belt in-plane shear stiffness and raised cornering force is achieved.

From the viewpoint of effectively mitigating a rigidity difference between the tire frame and the metal reinforcing cord member, the elastic modulus of the second specific covering mixture itself is preferably set higher than the elastic modulus of the tire frame, and lower than the elastic modulus of the metal reinforcing cord member.

The tensile elastic modulus as defined by JIS K7113:1995 of the second specific covering mixture itself is normally from approximately 50 MPa to approximately 2000 MPa, is preferably from 50 MPa to 1700 MPa, and is more preferably from 50 MPa to 1600 MPa.

Regarding the tensile elastic modulus of the second specific covering mixture itself, from the viewpoints of effectively mitigating the rigidity difference between the resin material forming the tire frame and the metal reinforcing cord member and raising the adhesion durability, and of achieving fractured states of ductile fractures even in a supposed case of a fracture, the tensile elastic modulus of the tire frame (x1), the tensile elastic modulus of the second specific covering mixture (x2), and the tensile elastic modulus of the metal reinforcing cord member (x3) preferably satisfy the relationship $x1<x2<x3$.

The elongation at break (tensile elongation at break) as defined by JIS 7161 of the second specific covering mixture itself is normally from approximately 10% to approximately 600%, is preferably from 10% to 500%, and is more preferably from 10% to 300%.

Regarding the elongation at break of the second specific covering mixture itself, from the viewpoint of effectively mitigating the rigidity difference between the resin material forming the tire frame and the metal reinforcing cord member and raising the adhesion durability, and of achieving fractured states of ductile fractures even in a supposed case of a fracture, preferably the elongation at break of the tire frame (y1), the elongation at break of the second specific covering mixture (y2), and the elongation at break of the metal reinforcing cord member (y3) satisfy the relationship $y3<y2<y1$.

Thermoplastic Resin

Examples of the thermoplastic resin included in the second specific covering mixture include the examples of the specific thermoplastic resin included in the first specific covering mixture.

Examples of the thermoplastic resin included in the second specific covering mixture, similarly to the specific thermoplastic resin, include urethane-based thermoplastic resins, olefin-based thermoplastic resins, vinyl chloride-based thermoplastic resins, polyamide-based thermoplastic resins, polyester-based thermoplastic resins, and polystyrene-based thermoplastic resins, with polyamide-based thermoplastic resins being particularly preferable. When a polyamide-based thermoplastic resin is employed as the thermoplastic resin of the second specific covering mixture, the pull-out resistance with respect to the metal reinforcing cord member can be further raised.

The thermoplastic resin included in the second specific covering mixture is preferably selected in consideration of the adhesiveness to the resin material employed in the tire frame. In particular, employing the same type of resin for the resin material forming the tire frame and the thermoplastic resin included in the second specific covering mixture enables the adhesiveness between the tire frame and the second specific covering mixture to be further raised. For example, in cases in which a polyamide-based thermoplastic resin is employed as the thermoplastic resin included in the second specific covering mixture, a polyamide-based thermoplastic elastomer is preferably employed in the tire frame.

The tensile elastic modulus as defined by JIS K7113:1995 of the thermoplastic resin itself, included in the second specific covering mixture, is preferably from 50 MPa to 2000 MPa, is more preferably from 70 MPa to 1700 MPa, and is particularly preferably from 100 MPa to 1600 MPa.

In cases in which a polyamide-based thermoplastic resin is employed as the thermoplastic resin included in the second specific covering mixture, from the viewpoint of raising the elastic modulus of the second specific covering mixture, the number average molecular weight of the polyamide-based thermoplastic resin is preferably from 300 to 30000. Moreover, from the viewpoint of toughness and flexibility at low temperature, the number average molecular weight of the polymer constituting the soft segment is preferably from 200 to 20000.

Specific Copolymer

The second specific covering mixture includes at least one (meth)acrylic-based copolymer (specific copolymer) selected from an olefin-(meth)acrylic acid copolymer (specific acid copolymer), an olefin-(meth)acrylate copolymer (specific ester copolymer), a metal-crosslinked product of the specific acid copolymer, and a metal-crosslinked product of the specific ester copolymer.

As described above, the specific copolymer has excellent flexibility, and has excellent adhesiveness to structures in which other resin materials, such as thermoplastic resins, are employed, and the flexibility of the second specific covering mixture is easily adjusted due to including the specific copolymer together with the thermoplastic resin in the second specific covering mixture.

In particular, the specific acid copolymer with acid groups raises the affinity between the thermoplastic resin and the specific copolymer constituting the second specific covering mixture, enabling the durability of the second specific covering mixture to be raised. Thus in the second specific covering mixture in which the specific acid copolymer is employed as the specific copolymer, phase separation between the thermoplastic resin and the specific copolymer does not readily occur.

Specific Acid Copolymer

"Olefin-(meth)acrylic acid copolymer" refers to a copolymer that includes a partial structure derived from (meth) acrylic acid in olefin repeating units. The form of the specific acid copolymer may be a radical polymer, a block copolymer, or a graft copolymer.

The olefin constituting the olefin repeating unit in the olefin-(meth)acrylic acid copolymer is preferably ethylene, propylene, or 1-butene, and is more preferably ethylene.

Namely, the olefin-(meth)acrylic acid copolymer is preferably an ethylene-(meth)acrylic acid copolymer. An ethylene-methacrylic acid copolymer is more preferable.

The olefin-(meth)acrylic acid copolymer may be employed singly, or two or more types thereof may be employed.

From the viewpoint of melt moldability of the second specific covering mixture, the number average molecular weight (Mn) of the specific acid copolymer is preferably from 5,000 to 10,000,000, and more preferably from 7,000 to 1,000,000.

A commercially available product may be employed as the specific acid copolymer, for example, NUCREL (such as N035C, or AN42115C) manufactured by Du Pont-Mitsui Polychemicals Co., Ltd. or the like may be employed.

Specific Ester Copolymer

"Olefin-(meth)acrylate copolymer" refers to a copolymer that includes a partial structure derived from (meth)acrylate in olefin repeating units.

The form of the specific ester copolymer may be a radical polymer, a block copolymer, or a graft copolymer.

The olefin constituting the olefin repeating unit in the olefin-(meth)acrylate copolymer is preferably ethylene, propylene, or 1-butene, and is more preferably ethylene.

Namely, the olefin-(meth)acrylate copolymer is preferably an ethylene-(meth)acrylate copolymer. An ethylene-methacrylate copolymer is more preferable.

The olefin-(meth)acrylate copolymer may be employed singly, or two or more types thereof may be employed.

From the viewpoint of melt moldability of the second specific covering mixture, the number average molecular weight (Mn) of the specific ester copolymer is preferably from 5,000 to 10,000,000, and is more preferably from 7,000 to 1,000,000.

A commercially available product may be employed as the specific ester copolymer, for example ELVALOY AC (such as 3427, 1125AC, or 2112AC) manufactured by Du Pont-Mitsui Polychemicals or the like may be employed.

As stated above, the specific acid copolymer has acid groups, and so the affinity between the thermoplastic resin and the specific copolymer constituting the second specific covering mixture is raised, enabling the durability of the second specific covering mixture to be raised.

Consequently, the affinity between the thermoplastic resin and the specific copolymer constituting the second specific covering mixture can also be raised by acid modification of the specific ester copolymer. Namely, the specific ester copolymer is also preferably an acid-modified copolymer (also referred to below as "specific acid-modified ester copolymer") formed by acid-modifying an olefin-(meth)acrylate copolymer.

Specific Acid-Modified Ester Copolymer

"Acid-modified copolymer formed by acid-modifying an olefin-(meth)acrylate copolymer" refers to a copolymer in which a compound having an acid group is bound to a copolymer that includes a partial structure derived from (meth)acrylate in olefin repeating units (namely an olefin-(meth)acrylate copolymer).

More specifically, "a compound having an acid group being bound to an olefin-(meth)acrylate copolymer" refers to an unsaturated compound having an acid group, such as a carboxylic acid group, a sulfuric acid group, or a phosphoric acid group, being bound to an olefin-(meth)acrylate copolymer. For example, when employing an unsaturated carboxylic acid (generally, maleic acid anhydride) as the unsaturated compound having an acid group, an unsaturated bond site of the unsaturated carboxylic acid may be bound (for example, graft-polymerized) to an olefin-(meth)acrylate copolymer.

From the viewpoint of suppressing deterioration of the olefin-(meth)acrylate copolymer, the compound having an acid group is preferably a compound having a carboxylic acid group (a carboxy group) that is a weak acid group, examples including acrylic acid, methacrylic acid, itaconic acid, crotonic acid, isocrotonic acid, and maleic acid.

The olefin constituting the olefin repeating unit in the olefin-(meth)acrylate copolymer to be acid-modified is preferably ethylene, propylene, or 1-butene, and more preferably ethylene.

Namely, the olefin-(meth)acrylate copolymer is preferably an ethylene-(meth)acrylate copolymer.

It is accordingly preferable that the specific acid-modified ester copolymer be an acid-modified product of an ethylene-(meth)acrylate copolymer.

More preferably, it is a carboxylic acid-modified copolymer formed by acid modification of an ethylene-(meth)acrylate ethylester copolymer by a compound having a carboxylic acid group (a carboxy group), and still more preferably it is a carboxylic acid-modified product of an ethylene-acrylate ethylester copolymer.

The specific acid-modified ester copolymer may be employed singly, or two or more types thereof of may be employed.

From the viewpoint of melt moldability of the second specific covering mixture, the number average molecular weight (Mn) of the specific acid-modified ester copolymer is preferably from 5,000 to 10,000,000, and more preferably from 7,000 to 1,000,000.

A commercially available product may be employed as the specific acid-modified ester copolymer, for example HPR (such as AR2011) manufactured by Du Pont-Mitsui Polychemicals Co., Ltd. or the like may be employed.

Metal-Crosslinked Product of the Specific Copolymer

Explanation will be given regarding an example of the metal-crosslinked product of the specific copolymer, in which the specific copolymer is an olefin-(meth)acrylic acid copolymer (the specific acid copolymer). In cases where the specific copolymer is an olefin-(meth)acrylate copolymer (the specific ester copolymer), "(meth)acrylic acid copolymer" may be substituted by "(meth)acrylate copolymer" in the explanation below.

The metal-crosslinked product of the olefin-(meth)acrylic acid copolymer refers to a copolymer that includes a partial structure derived from (meth)acrylic acid in olefin repeating units, in which there is bonding (crosslinking) through a metal ion ($M^{n+}$, where M is a metal, and n is the valency of the metal) between —COO⁻s, these having lost a proton ($H^+$), of (meth)acrylic acids in (meth)acrylic acid repeating units. Such metal-crosslinked copolymers are also referred to as ionomers. The form of the copolymer may be a radical copolymer, a block copolymer, or a graft copolymer.

Examples of metal ions capable of forming a crosslinked structure with COO⁻s of (meth)acrylates include monovalent ions such as lithium ($Li^+$), sodium ($Na^+$), or potassium ($K^+$), bivalent ions such as magnesium ($Mg^{2+}$), calcium ($Ca^{2+}$), barium ($Ba^{2+}$), or zinc ($Zn^{2+}$), and trivalent ions such as aluminum ($Al^{3+}$). Although metal ions such as lithium ($Li^+$), sodium ($Na^+$) magnesium ($Mg^{2+}$), zinc ($Zn^{2+}$) are ordinarily employed, of these, zinc ions are preferable from the viewpoints of imparting hardness to the thermoplastic resin material, and increasing deformation resistance.

The olefin constituting the olefin repeating unit in the metal-crosslinked product of the olefin-(meth)acrylic acid copolymer is preferably ethylene, propylene, or 1-butene, and ethylene is more preferable.

Namely, the metal-crosslinked product of the olefin-(meth)acrylic acid copolymer is preferably a metal-crosslinked product of an ethylene-(meth)acrylic acid copolymer. A metal-crosslinked product of an ethylene-methacrylic acid copolymer is more preferable, and a zinc ion crosslinked product of an ethylene-methacrylic acid copolymer is still more preferable.

The metal-crosslinked product of the olefin-(meth)acrylic acid copolymer may be employed singly, or two or more types thereof may be employed.

Content of Thermoplastic Resin and Specific Copolymer in the Second Specific Covering Mixture From the viewpoints of raising the characteristics such as the elongation at break of the second specific covering mixture, and raising the pull-out resistance of the metal reinforcing cord member with respect to the covering mixture, an embodiment is preferable in which the second specific covering mixture has a sea-island structure including a sea phase that is the matrix phase constituted by a thermoplastic resin, and an island phase that is a dispersed phase constituted by the specific copolymer. Due to the second specific covering mixture having a sea-island structure in which the specific copolymer is dispersed in the matrix of the thermoplastic resin, properties such as the elongation at break of the second specific covering mixture can be raised, and the pull-out resistance of the metal reinforcing cord member with respect to the second specific covering mixture can be raised.

In the second specific covering mixture, there are no particular limitations to the content of the thermoplastic resin, and, for example, in cases in which the sea-island structure is configured including a sea phase including the thermoplastic resin and an island phase including the specific copolymer, the content, by volume, of the thermoplastic resin is preferably from 51% by volume to 95% by volume, is more preferably from 60% by volume to 90% by volume, and is preferably from 70% by volume to 85% by volume with respect to the total content of the second specific covering mixture. Similarly, in terms of mass, although differing according to the specific weight of the thermoplastic resin selected, the content of the thermoplastic resin is preferably from 55% by mass to 95% by mass, is more preferably from 60% by mass to 90% by mass, and is particularly preferably from 70% by mass to 85% by mass with respect to the total content of the second specific covering mixture.

Similarly, there are no particular limitations to content of the specific copolymer in the second specific covering mixture, and in cases in which a sea-island structure is configured including a sea phase including a thermoplastic resin and an island phase including a specific copolymer, the content, by volume, of the specific copolymer is preferably from 5% by volume to 49% by volume, is more preferably from 10% by volume to 40% by volume, and is preferably from 15% by volume to 30% by volume with respect to the total content of the second specific covering mixture. Similarly, in terms of mass, although differing according to the specific weight of the thermoplastic resin selected, the content of the thermoplastic resin is preferably from 5% by mass to 45% by mass, is more preferably from 10% by mass to 40% by mass, and is preferably from 15% by mass to 30% by mass with respect to the total content of the second specific covering mixture.

From the viewpoint of easily forming the sea-island structure constituted by the sea phase including the thermoplastic resin and the island phase including the specific copolymer, the mass ratio (p/e) of the thermoplastic resin (p) and the specific copolymer (e) in the second specific covering mixture is preferably from 95/5 to 55/45, is more preferably from 90/10 to 60/40, and is preferably from 85/15 to 70/30.

In the above sea-island structure, impact resistance properties are particularly raised by finely dispersing the island phase in the thermoplastic resin.

When the second specific covering mixture contains the specific copolymer with acid groups, there is a tendency for the island phase to be smaller as the acid value of the specific copolymer having an acid group becomes higher, and for the island phase to be larger as the acid value becomes lower. Moreover, as the acid value of the specific copolymer with acid groups increases, the interaction between a polyamide-based thermoplastic resin and the specific copolymer with acid groups increases, and the melt viscosity of the second specific covering mixture increases. Using a combination of specific copolymer with acid groups, and specific copolymer without acid groups to adjust the acid value enables the melt viscosity of the second specific covering mixture to be suppressed from becoming too high.

As the specific copolymer, in cases in which a specific copolymer with acid groups (ca) is employed in combination with a specific ester copolymer without acid groups (cb), then from the viewpoint of suppressing the melt viscosity of the second specific covering mixture from becoming too high, a mass ratio (ca/cb) is preferably from 10/90 to 90/10, is preferably from 15/85 to 85/15, and is preferably from 20/80 to 80/20.

As the specific copolymer, in cases in which a specific copolymer not having metal cross-linking (c) is employed in combination with a metal crosslinked specific copolymer (cm), then, from the viewpoint of suppressing the elastic modulus of the second specific covering mixture from becoming too high, a mass ratio (c/cm) is preferably from 10/90 to 90/10, is preferably from 15/85 to 85/15, and is preferably from 20/80 to 80/20.

Generally, when a modified product such as an acid-modified product is employed, an effect is exhibited in which comparatively little energy is required during knead-mixing (dispersing), and high technology knead-mixing is not required. However, when the compounded amount thereof is larger, then gelling of the resin tends to occur, and defective external appearance (fisheyes) such as rough surfaces sometimes occurs during extrusion. From these viewpoints, when a specific copolymer with acid groups is employed as the specific copolymer, the content of the specific copolymer with acid groups in the second specific covering mixture is preferably 20% by mass or less, for example from 5% by mass to 20% by mass.

Fine dispersion of the island phase of the specific copolymer in the thermoplastic resin may be confirmed by inspecting images obtained using a scanning electron microscope (SEM).

The size (long axis of the island phase) of the island phase including the specific copolymer is preferably from approximately 0.4 μm to approximately 10.0 μm, more preferably from approximately 0.5 μm to approximately 7 μm, and particularly preferably from approximately 0.5 μm to approximately 5 μm. The size of each island phase may be measured by inspecting images obtained using a Scanning Electron Microscope (SEM).

Resin Material

Explanation will next be given regarding the resin material that forms the tire frame. Herein, the concept of "resin material" includes thermoplastic resins (including thermoplastic elastomers) and thermoset resins, but does not include vulcanized rubbers.

Examples of the thermoset resin include phenol-based resins, urea-based resins, melamine-based resins, epoxy-based resins, and polyamide-based resins. Examples of the thermoplastic resin include urethane-based resins, olefin-based resins, vinyl chloride-based resins, and polyamide-based resins.

The thermoplastic elastomer generally means a thermoplastic resin material constituted by a copolymer including a polymer that constitutes a hard segment, and a polymer that constitutes a soft segment. Examples of the thermoplastic elastomer include polyamide-based thermoplastic elastomers (TPA), polyester-based thermoplastic elastomers (TPC), polyolefin-based thermoplastic elastomers (TPO), polystyrene-based thermoplastic elastomers (TPS), polyurethane-based thermoplastic elastomers (TPU), crosslinked products of thermoplastic rubbers (TPV), and other thermoplastic elastomers (TPZ), as defined by JIS K6418. In consideration of the elasticity required during running, the moldability during manufacture, and the like, the tire frame preferably includes a thermoplastic resin as a resin material, and more preferably includes a thermoplastic elastomer. Employing a polyamide-based thermoplastic elastomer is particularly preferable.

In the present specification, resins being the "same type" indicates that both are ester-based, or both are styrene-based, or the like.

Polyamide-Based Thermoplastic Elastomer

The polyamide-based thermoplastic elastomer refers to a thermoplastic resin material that is formed of a copolymer having a polymer constituting a hard segment that is crystalline and has a high melting point, and a polymer constituting a soft segment that is amorphous and has a low glass transition temperature, wherein the polymer constituting the hard segment has amide bonds (—CONH—) in the main chain thereof. Examples of the polyamide-based thermoplastic elastomer include amide-based thermoplastic elastomers (TPA) and the like as defined by JIS K6418:2007, and polyamide-based elastomers and the like as described in JP-A 2004-346273.

Examples of the polyamide-based thermoplastic elastomer include materials with at least a polyamide constituting a hard segment that is crystalline and has a high melting point, and with another polymer (such as, for example, a polyester, or a polyether) constituting a soft segment that is amorphous and has a low glass transition temperature. The polyamide-based thermoplastic elastomer may also include a chain extender, such as a dicarboxylic acid, as well as the hard segment and the soft segment. Examples of polyamides for forming the hard segment include, for example, polyamides generated from monomers represented by the following Formula (1) or Formula (2).

$$H_2N-R^1-COOH \qquad \text{Formula (1)}$$

In Formula (1), $R^1$ represents a hydrocarbon molecular chain having from 2 to 20 carbon atoms, or an alkylene group having from 2 to 20 carbon atoms.

Formula (2):

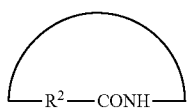

In Formula (2), $R^2$ represents a hydrocarbon molecular chain having from 3 to 20 carbon atoms, or an alkylene group having from 3 to 20 carbon atoms.

The $R^1$ in Formula (1) is preferably a hydrocarbon molecular chain having from 3 to 18 carbon atoms, or an alkylene group having from 3 to 18 carbon atoms, still more preferably a hydrocarbon molecular chain having from 4 to 15 carbon atoms, or an alkylene group having from 4 to 15 carbon atoms, and particularly preferably a hydrocarbon molecular chain having from 10 to 15 carbon atoms, or an alkylene group having from 10 to 15 carbon atoms. Moreover, the $R^2$ in Formula (2) is preferably a hydrocarbon molecular chain having from 3 to 18 carbon atoms, or an alkylene group having from 3 to 18 carbon atoms, is still more preferably a hydrocarbon molecular chain having from 4 to 15 carbon atoms, or an alkylene group having from 4 to 15 carbon atoms, and is particularly preferably a hydrocarbon molecular chain having from 10 to 15 carbon atoms, or an alkylene group having from 10 to 15 carbon atoms.

ω-aminocarboxylic acids and lactams are examples of the monomers represented by Formula (1) and Formula (2) above. Moreover, examples of the polyamide that forms the hard segment include condensation polymers of such ω-aminocarboxylic acids or lactams, and condensation copolymers of diamines and dicarboxylic acids.

Examples that may be employed as the ω-aminocarboxylic acid include aliphatic ω-aminocarboxylic acids having from 5 to 20 carbon atoms, such as 6-aminocaproic acid, 7-aminoheptanoic acid, 8-aminooctanoic acid, ω-aminocapric acid, 11-aminoundecanoic acid, or 12-aminododecanoic acid. Examples that may be employed as the lactam include aliphatic lactams having from 5 to 20 carbon atoms, such as lauryl lactam, ε-caprolactam, undecane lactam, ω-enantholactam, or 2-pyrrolidone.

Examples that may be employed as the diamine include diamine compounds such as aliphatic diamines having from 2 to 20 carbon atoms such as ethylene diamine, trimethylene diamine, tetramethylene diamine, hexamethylene diamine, heptamethylene diamine, octamethylene diamine, nonamethylene diamine, decamethylene diamine, undecamethylene diamine, dodecamethylene diamine, 2,2,4-trimethylhexamethylene diamine, 2,4,4-trimethylhexamethylene diamine, 3-methylpentamethylene diamine, or metaxylenediamine. Moreover, HOOC—$(R^3)_m$—COOH (wherein, $R^3$: a hydrocarbon molecular chain having from 3 to 20 carbon atoms, m: 0 or 1) may represent the dicarboxylic acid; examples thereof include an aliphatic dicarboxylic acid having from 2 to 20 carbon atoms such as oxalic acid, succinic acid, glutaric acid, adipic acid, pimelic acid, suberic acid, azelaic acid, sebacic acid, or dodecanedioic acid.

A polyamide formed by ring-opening polycondensation of lauryl lactam, ε-caprolactam or undecane lactam may be preferably employed as the polyamide that forms the hard segment.

Examples of the polymer that forms the soft segment include polyesters and polyethers, with examples thereof including polyethylene glycol, polypropylene glycol, polytetramethylene ether glycol, and ABA-type triblock polyethers. These may be employed singly, or in a combination of two or more types thereof. Moreover, a polyether diamine or the like, obtained via a reaction of ammonia or the like with a terminal of a polyether, may be employed.

Herein, "ABA-type triblock polyether" indicates a polyether represented by Formula (3) below.

Formula (3):

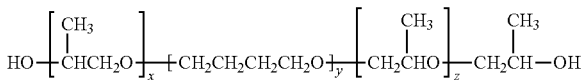

x and z in Formula (3) represent integers of from 1 to 20. y represents an integer of from 4 to 50.

As the respective values of the x and the z in Formula (3), integers of from 1 to 18 are preferable, integers of from 1 to 16 are still more preferable, integers of from 1 to 14 are particularly preferable, and integers of from 1 to 12 are most preferable. Moreover, as the value of y in Formula (3), an integer of from 5 to 45 is preferable, an integer of from 6 to 40 is more preferable, an integer of from 7 to 35 is particularly preferable, and an integer of from 8 to 30 is most preferable.

Respective combinations of the hard segments and the soft segments described above are examples of the combination of the hard segment and the soft segment. Preferable combinations from among these are a combination of a ring-opened polycondensate of lauryl lactam and polyethylene glycol, a combination of a ring-opened polycondensate of lauryl lactam and polypropylene glycol, a combination of a ring-opened polycondensate of lauryl lactam and polytetramethylene ether glycol, and a combination of a ring-opened polycondensate of lauryl lactam and an ABA-type triblock polyether. The combination of a ring-opened polycondensate of lauryl lactam and an ABA-type triblock polyether is particularly preferable.

From the viewpoint of melt moldability, the number average molecular weight of the polymer (polyamide) constituting the hard segment is preferably from 300 to 30000. From the viewpoints of toughness and low temperature flexibility, the number average molecular weight of the polymer constituting the soft segment is preferably from 200 to 20000. From the viewpoint of moldability, the mass ratio (x:y) of the hard segment (x) to the soft segment (y) is preferably from 50:50 to 90:10, and is more preferably from 50:50 to 80:20.

The polyamide-based thermoplastic elastomer may be synthesized using a known method to copolymerize a polymer forming the hard segment and a polymer forming the soft segment described above.

Examples of commercial products employable as the polyamide-based thermoplastic elastomer include products from the "UBESTA XPA" series (examples include XPA9063X1, XPA9055X1, XPA9048X2, XPA9048X1, XPA9040X1, XPA9040X2, andXPA9044), manufactured by Ube Industries, Ltd., and products from the "VESTAMID" series (for example, E40-S3, E47-S1, E47-S3, E55-S1, E55-S3, EX9200, and E50-R2), manufactured by Daicel-Evonik Ltd.

Polystyrene-Based Thermoplastic Elastomer

Examples of the polystyrene-based thermoplastic elastomer include materials with at least polystyrene constituting the hard segment, and with another polymer (for example polybutadiene, polyisoprene, polyethylene, hydrogenated polybutadiene, hydrogenated polyisoprene, or the like) constituting the soft segment that is amorphous and has a low glass transition temperature. Examples of polystyrenes that may be suitably employed for forming the hard segment include, for example, those obtained using known radical polymerization methods, or those obtained using known ionic polymerization methods, for example a polystyrene having an anionic living polymerization.

Examples of polymers for forming the soft segment include, for example, polybutadiene, polyisoprene, poly(2, 3-dimethyl-butadiene), and the like.

Respective combinations of the hard segment and the soft segment described above are examples of the above combination of the hard segment and the soft segment. Of these, a combination of polystyrene/polybutadiene, or a combination of polystyrene/polyisoprene, is preferable. Moreover, to suppress unintended crosslinking reactions of the thermoplastic elastomer, the soft segment is preferably hydrogenated.

The number average molecular weight of the polymer (polystyrene) constituting the hard segment is preferably from 5000 to 500000, and preferably from 10000 to 200000.

Moreover, the number average molecular weight of the polymer(s) constituting the soft segment is preferably from 5000 to 1000000, more preferably from 10000 to 800000, and particularly preferably from 30000 to 500000. Moreover, from the viewpoint of moldability, the volume ratio (x:y) of the hard segment (x) to the soft segment (y) is preferably from 5:95 to 80:20, and still more preferably from 10:90 to 70:30.

The polystyrene-based thermoplastic elastomer may be synthesized using a known method to copolymerize a polymer forming the hard segment and a polymer forming the soft segment described above.

Examples of the polystyrene-based thermoplastic elastomer include styrene-butadiene-based copolymers [SBS (polystyrene-poly(butylene)block-polystyrene), and SEBS (polystyrene-poly(ethylene/butylene)block-polystyrene)], styrene-isoprene copolymers [polystyrene-polyisoprene block-polystyrene], and styrene-propylene-based copolymers [SEP (polystyrene-(ethylene/propylene)block), SEPS (polystyrene-poly(ethylene/propylene)block-polystyrene), SEEPS (polystyrene-poly(ethylene-ethylene/propylene)block-polystyrene)], and SEB (polystyrene (ethylene/butylene)block).

Examples of commercial products that may be used as the polystyrene-based thermoplastic elastomer include for example those from the "TUFTEC" series (for example, H1031, H1041, H1043, H1051, H1052, H1053, TUFTEC H1062, H1082, H1141, H1221, or H1272), manufactured by Asahi Kasei Corporation, and SEBS (such as 8007, 8076) and SEPS (such as 2002, 2063), manufactured by Kuraray Co., Ltd.

Polyurethane-Based Thermoplastic Elastomer

Examples of the polyurethane-based thermoplastic elastomer include materials with at least a polyurethane constituting a hard segment that forms pseudo crosslinks caused by physical aggregation, and another polymer constituting a soft segment that is amorphous and has a low glass transition temperature; for example, a copolymer including a soft segment including the unit of structure represented by the Formula (A) below, and a hard segment including the unit of structure represented by the Formula (B) below.

Formula (A):

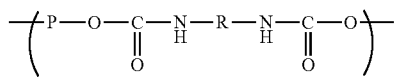

Formula (B):

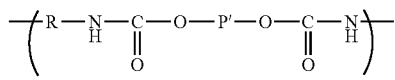

In the above Formulae, P represents a long-chain aliphatic polyether, or a long-chain aliphatic polyester. R represents an aliphatic hydrocarbon, an alicyclic hydrocarbon, or an aromatic hydrocarbon. P' represents a short-chain aliphatic hydrocarbon, an alicyclic hydrocarbon, or an aromatic hydrocarbon.

In Formula (A), examples that may be employed as the long-chain aliphatic polyether or the long-chain aliphatic polyester represented by the P include those having a molecular weight of from 500 to 5000. The P is derived from a diol compound including a long-chain aliphatic polyether, or a long-chain aliphatic polyester, represented by the P. Examples of such diol compounds include polyethylene glycols, polypropylene glycols, polytetramethylene ether glycols, poly(butylene adipate) diols, poly-ε-caprolactone diols, poly(hexamethylene carbonate) diols, and the ABA-type triblock polyethers within the molecular weight range described above.

These compounds may be employed singly, or in a combination of two or more types thereof.

In Formula (A), and Formula (B), the R is derived from a diisocyanate compound including an aliphatic hydrocarbon, an alicyclic hydrocarbon, or an aromatic hydrocarbon represented by the R. Examples of aliphatic diisocyanate compounds including an aliphatic hydrocarbon represented by the R include 1,2-ethylene diisocyanate, 1,3-propylene diisocyanate, 1,4-butane diisocyanate, and 1,6-hexamethylene diisocyanate. Examples of diisocyanate compounds including an alicyclic hydrocarbon represented by the R include 1,4-cyclohexane diisocyanate, or 4,4-cyclohexane diisocyanate. Examples of aromatic diisocyanate compounds including the aromatic hydrocarbon represented by the R include 4,4'-diphenylmethane diisocyanate, or tolylene diisocyanate.

These compounds may be employed singly, or in a combination of two or more types thereof.

In Formula (B), examples that may be employed as a short-chain aliphatic hydrocarbon, alicyclic hydrocarbon, or aromatic hydrocarbon represented by P' include those having a molecular weight of less than 500. Moreover, the P' is derived from a diol compound including a short-chain aliphatic hydrocarbon, alicyclic hydrocarbon, or aromatic hydrocarbon represented by the P'. Examples of aliphatic diol compounds including a short-chain aliphatic hydrocarbon represented by the P' include glycols, and polyalkylene glycols, with examples thereof including ethylene glycol, propylene glycol, trimethylene glycol, 1,4-butanediol, 1,3-butanediol, 1,5-pentanediol, 1,6-hexanediol, 1,7-heptanediol, 1,8-octanediol, 1,9-nonanediol, and 1,10-decanediol.

Moreover, examples of alicyclic diol compounds including an alicyclic hydrocarbon represented by the P' include cyclopentane-1,2-diol, cyclohexane-1,2-diol, cyclohexane-1,3-diol, cyclohexane-1,4-diol, and cyclohexane-1,4-dimethanol.

Furthermore, examples of aromatic diol compounds including an aromatic hydrocarbon represented by the P' include hydroquinone, resorcinol, chlorohydroquinone, bromohydroquinone, methylhydroquinone, phenylhydroquinone, methoxyhydroquinone, phenoxyhydroquinone, 4,4'-dihydroxybiphenyl, 4,4'-dihydroxydiphenylether, 4,4'-dihydroxydiphenylsulfide, 4,4'-dihydroxydiphenylsulfone, 4,4'-dihydroxybenzophenone, 4,4'-dihydroxydiphenylmethane, bisphenol A, 1,1-di(4-hydroxyphenyl)cyclohexane, 1,2-bis(4-hydroxyphenoxy)ethane, 1,4-dihydroxynaphthalene, and 2,6-dihydroxynaphthalene.

These compounds may be employed singly, or in a combination of two or more types thereof.

From the viewpoint of melt moldability, the number average molecular weight of the polymer (polyurethane) constituting the hard segment is preferably from 300 to 1500. Moreover, from the viewpoints of flexibility and thermal stability of the polyurethane-based thermoplastic elastomer, the number average molecular weight of the polymer constituting the soft segment is preferably from 500 to 20000, more preferably from 500 to 5000, and particularly preferably from 500 to 3000. Moreover, from the viewpoint of moldability, the mass ratio (x:y) of the hard segment (x) to the soft segment (y) is preferably from 15:85 to 90:10, and more preferably from 30:70 to 90:10.

The polyurethane-based thermoplastic elastomer may be synthesized by a known method to copolymerize a polymer forming the hard segment and a polymer forming the soft segment described above. The thermoplastic polyurethane described in JP-A H05-331256, for example, may be employed as the polyurethane-based thermoplastic elastomer.

Specifically, the polyurethane-based thermoplastic elastomer is preferably a combination of a hard segment consisting of an aromatic diol and an aromatic diisocyanate, and a soft segment consisting of a polycarbonate ester, with a tolylene diisocyanate (TDI)/polyester-based polyol copolymer, a TDI/polyether-based polyol copolymer, a TDI/caprolactone-based polyol copolymer, a TDI/polycarbonate-based polyol copolymer, a 4,4'-diphenylmethane diisocyanate (MDI)/polyester-based polyol copolymer, an MDI/polyether-based polyol copolymer, an MDI/caprolactone-based polyol copolymer, an MDI/polycarbonate-based polyol copolymer, or an MDI+hydroquinone/polyhexamethylene carbonate copolymer being preferable, and a TDI/polyester-based polyol copolymer, a TDI/polyether-based polyol copolymer, an MDI/polyester polyol copolymer, an MDI/polyether-based polyol copolymer, or an MDI+hydroquinone/polyhexamethylene carbonate copolymer being more preferable.

Moreover, examples of commercial products that may be employed as the polyurethane-based thermoplastic elastomer include the "ELASTOLLAN" series (examples include ET680, ET880, ET690, and ET890), manufactured by BASF SE, the "KURAMIRON U" series (for example, 2000 series, 3000 series, 8000 series, and 9000 series), manufactured by Kuraray Co., Ltd., and the "MIRACTRAN" series (for example, XN-2001, XN-2004, P390RSUP, P480RSUI, P26MRNAT, E490, E590, and P890), manufactured by Nippon Miractran Co., Ltd.

Polyolefin-Based Thermoplastic Elastomer

Examples of the "polyolefin-based thermoplastic elastomer" include materials with at least a polyolefin constituting a hard segment that is crystalline and has a high melting point, and another polymer (for example the polyolefin, another polyolefin, or a polyvinyl compound) constituting a soft segment that is amorphous and has a low glass transition temperature. Examples of polyolefins to form the hard segment include, for example, polyethylene, polypropylene, isotactic polypropylene, and polybutene.

Examples of the polyolefin-based thermoplastic elastomer include olefin-α-olefin random copolymers, and olefin block copolymers, with examples thereof including propylene block copolymers, ethylene-propylene copolymers, propylene-1-hexene copolymers, propylene-4-methyl-1-pentene copolymers, propylene-1-butene copolymers, ethylene-1-hexene copolymers, ethylene-4-methyl-pentene copolymers, ethylene-1-butene copolymers, 1-butene-1-hexene copolymers, 1-butene-4-methyl-pentene, ethylene-methacrylic acid copolymers, ethylene-methyl methacrylate copolymers, ethylene-ethyl methacrylate copolymers, ethylene-butyl methacrylate copolymers, ethylene-methyl acrylate copolymers, ethylene-ethyl acrylate copolymers, ethylene-butyl acrylate copolymers, propylene-methacrylic acid copolymers, propylene-methyl methacrylate copolymers, propylene-ethyl methacrylate copolymers, propylene-butyl methacrylate copolymers, propylene-methyl acrylate copolymers, propylene-ethyl acrylate copolymers, propylene-butyl acrylate copolymers, ethylene-vinyl acetate copolymers, and propylene-vinyl acetate copolymers.

Preferable examples of the polyolefin-based thermoplastic elastomer include propylene block copolymers, ethylene-propylene copolymers, propylene-1-hexene copolymers, propylene-4-methyl-1-pentene copolymers, propylene-1-butene copolymers, ethylene-1-hexene copolymers, ethylene-4-methyl-pentene copolymers, ethylene-1-butene copolymers, ethylene-methacrylic acid copolymers, ethylene-methyl methacrylate copolymers, ethylene-ethyl methacrylate copolymers, ethylene-butyl methacrylate copolymers, ethylene-methyl acrylate copolymers, ethylene-ethyl acrylate copolymers, ethylene-butyl acrylate copolymers, propylene-methacrylic acid copolymers, propylene-methyl methacrylate copolymers, propylene-ethyl methacrylate copolymers, propylene-butyl methacrylate copolymers, propylene-methyl acrylate copolymers, propylene-ethyl acrylate copolymers, propylene-butyl acrylate copolymers, ethylene-vinyl acetate copolymers, and propylene-vinyl acetate copolymers, and still more preferable examples thereof include ethylene-propylene copolymers, propylene-1-butene copolymers, ethylene-1-butene copolymers, ethylene-methyl methacrylate copolymers, ethylene-methyl acrylate copolymers, ethylene-ethyl acrylate copolymers, and ethylene-butyl acrylate copolymers.

Moreover, two or more polyolefin resins, such as ethylene and propylene, may be used in combination. The polyolefin content ratio in the polyolefin-based thermoplastic elastomer is preferably from 50% by mass to 100% by mass.

The number average molecular weight of the polyolefin-based thermoplastic elastomer is preferably from 5,000 to 10,000,000. If the number average molecular weight of the polyolefin-based thermoplastic elastomer is from 5,000 to 10,000,000, then the thermoplastic resin material has sufficient mechanical physical properties and excellent workability. From similar viewpoints, the number average molecular weight is more preferably from 7,000 to 1,000,000, and is particularly preferably from 10,000 to 1,000,000. This thereby enables further improvements to the mechanical physical properties and workability of the thermoplastic resin material. From the viewpoints of toughness and low temperature flexibility, the number average molecular weight of the polymer constituting the soft segment is preferably from 200 to 6000. From the viewpoint of moldability, the mass ratio (x:y) of the hard segment (x) to the soft segment (y) is preferably from 50:50 to 95:15, and is still more preferably from 50:50 to 90:10.

The polyolefin-based thermoplastic elastomer may be synthesized by copolymerization via a known method.

An acid modified thermoplastic elastomer may also be employed as the thermoplastic elastomer.

The "acid-modified thermoplastic elastomer" means a product of causing an unsaturated compound having an acid group, such as a carboxylic acid group, a sulfuric acid group, or a phosphoric acid group, to bond with a thermoplastic elastomer. For example, when an unsaturated carboxylic acid is employed (generally, a maleic acid anhydride) as the unsaturated compound having an acid group, an unsaturated bond site of the unsaturated carboxylic acid may be bound (for example, graft-polymerized) to the olefin-based thermoplastic elastomer.

From the viewpoint of suppressing degradation of the polyamide-based thermoplastic elastomer and the thermoplastic elastomer other than the polyamide-based thermoplastic elastomer, the compound having an acid group is preferably a compound having a carboxylic acid group that is a weak acid group, and examples include acrylic acid, methacrylic acid, itaconic acid, crotonic acid, isocrotonic acid, and maleic acid.

Examples of commercial products employable as the polyolefin-based thermoplastic elastomer described above include, for example, products from the "TAFMER" series (for example, A0550S, A1050S, A4050S, A1070S, A4070S, A35070S, A1085S, A4085S, A7090, A70090, MH7007, MH7010, XM-7070, XM-7080, BL4000, BL2481, BL3110, BL3450, P-0275, P-0375, P-0775, P-0180, P-0280, P-0480, and P-0680), manufactured by Mitsui Chemicals, Inc., products from the "NUCREL" series (for example, AN4214C, AN4225C, AN42115C, NO903HC, N0908C, AN42012C, N410, N1050H, N1108C, N1110H, N1207C, N1214, AN4221C, N1525, N1560, N0200H, AN4228C, AN4213C, and N035C) and products from the "Elvaloy AC" series (for example, 1125AC, 1209AC, 1218AC, 1609AC, 1820AC, 1913AC, 2112AC, 2116AC, 2615AC, 2715AC, 3117AC, 3427AC, and 3717AC), manufactured by Du Pont-Mitsui Polychemicals Co., Ltd., products from the "ACRYFT" series and products from the "EVATATE" series, manufactured by Sumitomo Chemical Co., Ltd., and products from the "ULTRATHENE" series, manufactured by Tosoh Corporation.

Moreover, commercial products employable as the polyolefin-based thermoplastic elastomer also include, for example, products from the "PRIME TPO" series (examples include, E-2900H, F-3900H, E-2900, F-3900, J-5900, E-2910, F-3910, J-5910, E-2710, F-3710, J-5910, E-2740, F-3740, R110MP, R110E, T310E, and M142E), manufactured by Prime Polymer Co., Ltd.

Polyester-Based Thermoplastic Elastomer

Examples of the polyester-based thermoplastic elastomer include materials with at least a polyester constituting a hard segment that is crystalline and has a high melting point, and another polymer (such as a polyester or a polyether) constituting a soft segment that is amorphous and has a low glass transition temperature.

An aromatic polyester may be employed as the polyester that forms the hard segment. The aromatic polyester may be formed from, for example, an aromatic dicarboxylic acid or an ester-forming derivative thereof, and an aliphatic diol. The aromatic polyester is preferably polybutylene terephthalate derived from terephthalic acid and/or dimethyl terephthalate, and 1,4-butanediol. Moreover, the aromatic polyester may be a polyester derived from a dicarboxylic acid component such as isophthalic acid, phthalic acid, naphthalene-2,6-dicarboxylic acid, naphthalene-2,7-dicarboxylic acid, diphenyl-4,4'-dicarboxylic acid, diphenoxyethane dicarboxylic acid, or 5-sulfoisophthalic acid, or an ester-forming derivative thereof, and a diol with a molecular weight of 300 or less, for example: an aliphatic diol such as ethylene glycol, trimethylene glycol, pentamethylene glycol, hexamethylene glycol, neopentyl glycol, or decamethylene glycol; an alicyclic diol such as 1,4-cyclohexane dimethanol, or tricyclodecane dimethylol; or an aromatic diol such as xylylene glycol, bis(p-hydroxy)diphenyl, bis(p-hydroxyphenyl)propane, 2,2-bis[4-(2-hydroxyethoxy)phenyl]propane, bis[4-(2-hydroxyl)phenyl]sulfone, 1,1-bis[4-(2-hydroxyethoxyl)phenyl]cyclohexane, 4,4'-dihydroxy-p-terphenyl, or 4,4'-dihydroxy-p-quaterphenyl. Moreover, the aromatic polyester may be a copolyester in which two or more of the above dicarboxylic acid components and diol components are employed in combination. Copolymerization can also be made with a polyfunctional carboxylic acid component, a polyfunctional oxyacid component, a polyfunctional hydroxy component, or the like, having three or more functional groups, in a range of 5% by mol or less.

Examples of polyesters to form the hard segment include polyethylene terephthalate, polybutylene terephthalate, polymethylene terephthalate, polyethylene naphthalate, and polybutylene naphthalate, with polybutylene terephthalate being preferable.

Aliphatic polyesters and aliphatic polyethers are examples of polymers to form the soft segment.

Examples of the aliphatic polyether include poly(ethylene oxide)glycol, poly(propylene oxide)glycol, poly(tetramethylene oxide)glycol, poly(hexamethylene oxide)glycol, a copolymer of ethylene oxide and propylene oxide, an ethylene oxide addition polymer of poly(propylene oxide) glycol, and a copolymer of ethylene oxide and tetrahydrofuran.

Examples of the aliphatic polyester include poly(ε-caprolactone), polyenantholactone, polycaprylolactone, polybutylene adipate, and polyethylene adipate.

Of these aliphatic polyethers and aliphatic polyesters, poly(tetramethylene oxide)glycol, an ethylene oxide adduct of poly(propylene oxide)glycol, poly(ε-caprolactone), polybutylene adipate, polyethylene adipate, or the like is preferable from the viewpoint of the elasticity characteristics of the obtainable polyester block copolymer.

Moreover, from the viewpoints of toughness and flexibility at low temperature, the number average molecular weight of the polymer constituting the soft segment is preferably from 300 to 6000. Moreover, from the viewpoint of moldability, the mass ratio (x:y) of the hard segment (x) to the soft segment (y) is preferably from 99:1 to 20:80, and still more preferably from 98:2 to 30:70.

Examples of the above combination of hard segment and soft segment may include respective combinations of the hard segments and the soft segments described above. Of these, a combination in which the hard segment is polybutylene terephthalate, and the soft segment is an aliphatic polyether is preferable, and a combination in which the hard segment is polybutylene terephthalate, and the soft segment is poly(ethylene oxide)glycol is still more preferable.

As the polyester-based thermoplastic elastomer, for example, commercial products from the "HYTREL" series (such as, for example, 3046, 5557, 6347, 4047, and 4767), manufactured by Du Pont-Toray Co., Ltd., and from the "PELPRENE" series (such as P30B, P40B, P40H, P55B, P70B, P150B, P280B, P450B, P150M, S1001, S2001, S5001, S6001, and S9001), manufactured by Toyobo Co., Ltd., may be employed.

The above thermoplastic elastomers may be synthesized by a known method to copolymerize a polymer forming the hard segment and a polymer forming the soft segment described above.

The melting point of the resin material is normally from approximately 100° C. to 350° C. and, from the viewpoint of tire productivity, is preferably from approximately 100° C. to 250° C., and is more preferably from 100° C. to 200° C.

The durability of the tire and the productivity may be raised. Various additives, such as rubbers, elastomers, thermoplastic resins, various fillers (for example, silica, calcium carbonate, or clays), anti-aging agents, oils, plasticizers, coloring agents, or weather resistant agents, may be included in (blended into) the resin material as desired.

As the resin material forming the tire frame, preferably a resin material is employed having a difference in SP value (solubility parameter) of 10.0 or less from a polar thermoplastic resin covering the metal reinforcing cord member. The difference in SP value is preferably 7.0 or less, and is more preferably 5.0 or less. When the difference between the polar thermoplastic resin and resin in the tire frame is 10.0 or less, the adhesiveness between the tire frame and the first specific covering mixture (the second specific covering mixture in the second tire of the invention) covering the metal reinforcing cord member are raised, enabling the adhesion durability of the metal reinforcing cord member to be raised.

The tensile elastic modulus as defined in JIS K7113:1995 of the resin material (tire frame) itself is preferably from 50 MPa to 1000 MPa, is more preferably from 50 MPa to 800 MPa, and is particularly preferably from 50 MPa to 700 MPa. If the tensile elastic modulus of the resin material is from 100 MPa to 1000 MPa, then this enables the tire frame to be efficiently fitted onto a rim while maintaining the shape of the tire frame.

The tensile yield strength as defined in JIS K7113:1995 of the resin material (tire frame) itself is preferably 5 MPa or greater, is preferably from 5 MPa to 20 MPa, and is more preferably from 5 MPa to 17 MPa. The tensile yield strength of the resin material being 5 MPa or greater enables withstanding deformation under load on the tire, such as during running The tensile strength as defined by JIS K7113:1995 of the resin material (tire frame) itself is ordinarily from approximately 15 MPa to approximately 70 MPa, is preferably from 17 MPa to 60 MPa, and is more preferably from 20 MPa to 55 MPa.

The tensile yield elongation as defined in JIS K7113:1995 of the resin material (tire frame) itself is preferably 10% or greater, is preferably from 10% to 70%, and is more preferably from 15% to 60%. Setting the tensile yield elongation of the resin material to 10% or greater enables a large elastic region and good fittability onto a rim.

The elongation at break (tensile elongation at break) as defined in JIS K7113:1995 of the resin material (tire frame) itself is preferably 50% or greater, is preferably 100% or greater, is more preferably 150% or greater, and is particularly preferably 200% or greater. Setting the elongation at break of the resin material to 50% or greater enables good fittability onto a rim, and reduces the susceptibility to damage on impact.

The deflection temperature under load as defined in ISO75-2 or ASTM D648 of the resin material (tire frame) itself (at a load of 0.45 MPa) is preferably 50° C. or greater, is preferably from 50° C. to 150° C., and is more preferably from 50° C. to 130° C. Setting the deflection temperature under load of the resin material to 50° C. or greater enables deformation of the tire frame to be suppressed even in cases in which vulcanization is performed during tire manufacture.

1-1 Embodiment

Explanation next follows regarding a tire according to a 1-1 embodiment, that is a first embodiment of a first tire of the invention, with reference to the drawings.

Figure 1B:
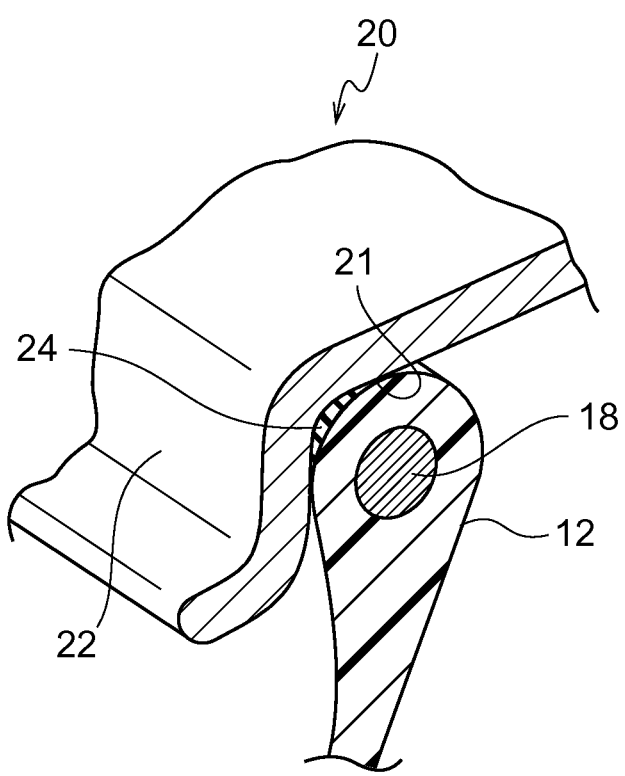
FIG. 1B is a cross-section of a bead portion that has been fitted onto a rim in an embodiment of the invention.

Explanation follows regarding a tire 10 of the present embodiment. FIG. 1A is a perspective view illustrating a cross-section of a portion of the tire according to an embodiment of the invention. FIG. 1B is a cross-section of a bead portion fitted to a rim. As illustrated in FIG. 1, the tire 10 of the present embodiment exhibits a cross-section profile that is substantially the same as an ordinary conventional rubber-made pneumatic tire. In the present embodiment, a steel cord (with a tensile elastic modulus of 210000 MPa, and an elongation at break of 8%), having a twisted structure, is employed as the metal reinforcing cord member, and a reinforcing cord 26 is employed, in which the first specific covering mixture, including at least the specific thermoplastic resin and the acid-modified olefin-based thermoplastic resin, covers the outer circumference of the steel cord that acts as a core. In the present embodiment, explanation follows of an example employing a mixture (tensile elastic modulus 1130 MPa, tensile strength 1130 MPa, elongation at break 240%) of the amide 12 that is a polyamide-based thermoplastic resin (for example, a 1:1 (mass ratio) mixture of "3014U" and "3024U", manufactured by Ube Industries, Ltd.), at 70% by mass, as the specific thermoplastic resin, and "ADMER QF551" manufactured by Mitsui Chemicals Inc., at 30% by mass, as the specific acid-modified polyolefin.

In the present embodiment, in a cross-section view taken along the axial direction of the tire frame (the tire case 17), the metal reinforcing cord member (namely, the reinforcing cord 26) covered by the thermoplastic resin is wound in a helical shape with at least a portion thereof embedded in the outer circumference of the tire frame.

As illustrated in FIG. 1A, the tire 10 is equipped with a tire case 17 configured including a pair of bead portions 12 that each make contact with a bead seat 21 and a rim flange 22 of the rim 20 illustrated in FIG. 1B, side portions 14 that respectively extend from the bead portions 12 toward the tire radial direction outside, and a crown portion 16 (outer circumference) that connects together the tire radial direction outside end of one side portion 14 and the tire radial direction outside end of the other side portion 14.

The tire case 17 of the present embodiment is formed by employing a polyamide-based thermoplastic elastomer (for example, UBESTA "XPA9055X1", manufactured by Ube Industries Ltd.: tensile elastic modulus 303 MPa, tensile strength 41 MPa, and elongation at break 350%).

The tire case 17 of the present embodiment is formed with a single thermoplastic resin material; however, the configuration of the invention is not limited thereto, and similarly to ordinary conventional rubber-made pneumatic tires, thermoplastic resin materials with different characteristics may be employed for each of the sections of the tire case 17 (such as the side portions 14, the crown portion 16 and the bead portions 12). The tire case 17 may be reinforced by a reinforcing material by embedding the reinforcing material (such as fibers, cord, nonwoven fabric, or woven fabric of a polymer material or metal) in the tire case 17 (for example, in the bead portions 12, the side portions 14, the crown portion 16, and the like).

In the tire case 17 of the present embodiment, a pair of tire case half parts (tire frame pieces) 17A formed of the resin material containing the polyamide-based thermoplastic elastomer, are bonded together. The tire case half parts 17A are each formed as a single body of one of the bead portions 12, one of the side portions 14, and half the width of the crown portion 16, by injection molding or the like, to give tire case half parts 17A of the same annular shape that are then aligned facing each other and bonded together at tire equatorial plane portions. Note that the tire case 17 is not limited to that formed by bonding two members, and may be formed by bonding three or more members.

The tire case half parts 17A formed with the resin material may, for example, be molded by vacuum molding, pressure molding, injection molding, melt casting, or the like. The need to perform vulcanization is therefore eliminated in contrast to conventional cases in which a tire case is formed of rubber, enabling manufacturing processes to be greatly simplified, and enabling molding time to be reduced.

In the present embodiment, the tire case half parts 17A are formed in left-right symmetrical shapes, namely one of the tire case half parts 17A is formed in the same shape as the other of the tire case half parts 17A, with the advantage that one type of mold suffices for molding the tire case half parts 17A.

In the present embodiment, as illustrated in FIG. 1B, an annular bead core 18, formed of steel cord, is embedded in the bead portions 12, similarly to in ordinary conventional pneumatic tires. However, the invention is not limited to such a configuration, and the bead core 18 may be omitted as long as the rigidity of the bead portions 12 is secured, and there are no issues with fitting onto the rim 20. Other than steel cord, the bead core 18 may also be formed of, for example, organic fiber cord, organic fiber cord covered with a resin, or a hard resin.

In the present embodiment, an annular seal layer 24 formed of a material with more excellent sealing properties than the resin material forming the tire case 17, for example rubber, is formed at portions of the bead portions 12 that contact the rim 20, and at least at portions that contact the rim flanges 22 of the rim 20. The seal layer 24 may also be formed at portions where the tire case 17 (the bead portions 12) and the bead seats 21 contact each other. A softer material than the resin material forming the tire case 17 may be employed as the material with more excellent sealing properties than the resin material forming the tire case 17. As a rubber capable of being employed as the seal layer 24, the same type of rubber is preferably employed as the rubber employed on bead portion external faces of ordinary conventional rubber-made pneumatic tires. The rubber seal layer 24 may also be omitted as long as sealing properties with the rim 20 can be secured with the resin material forming the tire case 17 alone, or another thermoplastic resin (thermoplastic elastomer) with more excellent sealing properties than the resin material may also be employed. Examples of such other thermoplastic resins include resins such as polyurethane-based resins, polyolefin-based resins, polystyrene-based resins, polyester resins, and blends of these resins and a rubber or elastomer, or the like. A thermoplastic elastomer may also be employed, and examples include polyester-based thermoplastic elastomers, polyurethane-based thermoplastic elastomers, polystyrene-based thermoplastic elastomers, polyolefin-based thermoplastic elastomers, a combination of such elastomers with each other, and a blend thereof with rubber, and the like.

As illustrated in FIG. 1, the reinforcing cord 26, in which the steel cord configuring the tire case 17 is covered by the first specific covering mixture including at least the specific thermoplastic resin and the acid-modified olefin-based thermoplastic resin, is wound in the tire case 17 circumferential direction onto the crown portion 16. The reinforcing cord 26 is wound in a helical shape, such that at least a portion thereof is in an embedded state in the crown portion 16 in cross-section taken along the tire case 17 axial direction. A tread 30, formed of a material, for example rubber, having more excellent abrasion resistance than the resin material constituting the tire case 17, is disposed at the tire radial direction outer circumferential side of the reinforcing cord 26.

Figure 2:
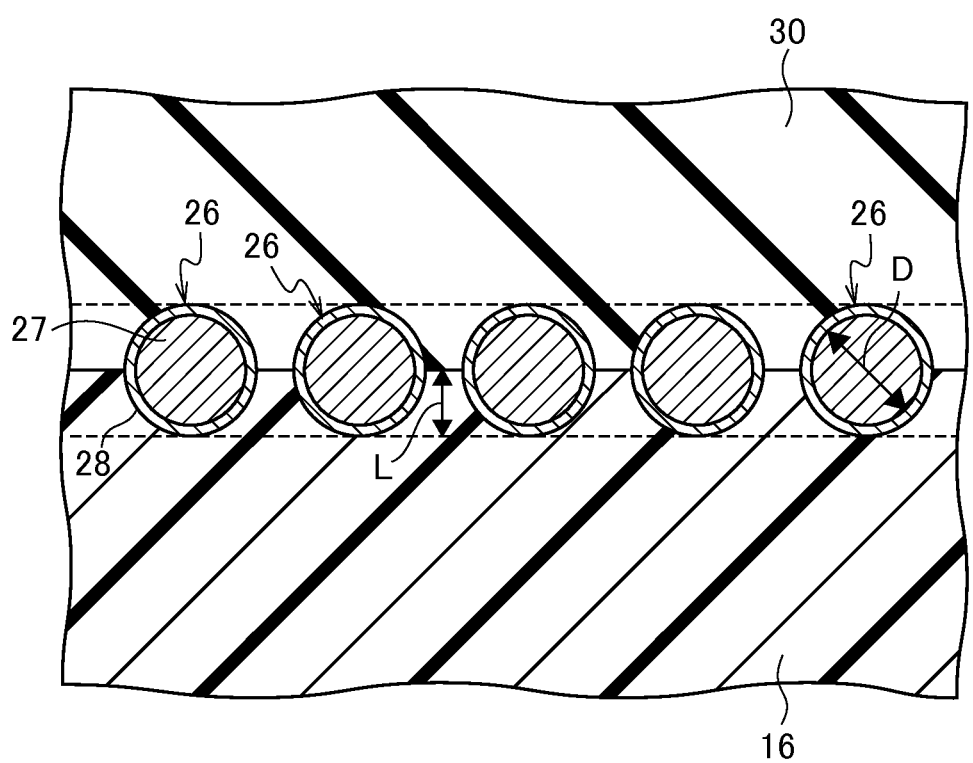
FIG. 2 is a cross-section taken along the tire rotation axis of a tire of a 1-1 embodiment, and illustrating a state in which a reinforcing cord is embedded in a crown portion of a tire case.

Explanation follows regarding the reinforcing cord 26, with reference to FIG. 2. FIG. 2 is a cross-section along the tire rotation axis illustrating a state in which a reinforcing cord is embedded in a crown portion of a tire case of the tire of the 1-1 embodiment. As illustrated in FIG. 2, the reinforcing cord 26 is wound in a helical shape, such that at least a portion thereof is embedded in the crown portion 16 in cross-section taken along the tire case 17 axial direction. The portion of the reinforcing cord 26 embedded in the crown portion 16 is in a close contact state with the resin material constituting the crown portion 16 (the tire case 17).

As illustrated in FIG. 2, the reinforcing cord 26 has a structure with a core of the steel cord 27 of twisted steel fibers, with the outer circumference of the steel cord 27 covered by the first specific covering mixture 28 that includes at least the specific thermoplastic resin and the acid-modified olefin-based thermoplastic resin. There are no particular limitations to the layer thickness of the first specific covering mixture 28 covering the steel cord 27, and the average layer thickness is preferably from approximately 0.2 mm to approximately 4.0 mm, more preferably from 0.5 mm to 3.0 mm, and particularly preferably from 0.5 mm to 2.0 mm. The elastic modulus of the first specific covering mixture 28 is preferably set in the range of from 0.1 times to 10 times the elastic modulus of the resin material forming the tire case 17. When the elastic modulus of the first specific covering mixture 28 is 10 times the elastic modulus of the thermoplastic resin material forming the tire case 17 or lower, the crown portion is not too hard, and fitting onto a rim is easily achieved. When the elastic modulus of the first specific covering mixture 28 is 0.1 times the elastic modulus of the thermoplastic resin material forming the tire case 17 or greater, the first specific covering mixture 28 is not too soft and belt in-plane shear stiffness is excellent, raising cornering force.

The depth L of embedding in FIG. 2 illustrates a depth of embedding of the reinforcing cord 26 with respect to the tire case 17 (the crown portion 16) along the tire rotation axis direction. The depth L of embedding of the reinforcing cord 26 with respect to the crown portion 16 is preferably ⅕ of the diameter D of the reinforcing cord 26, or greater, and more preferably exceeds ½ thereof. It is most preferable for the whole of the reinforcing cord 26 to be embedded in the crown portion 16. From a dimensional perspective of the reinforcing cord 26, setting the depth L of embedding of the reinforcing cord 26 to exceed ½ the diameter D of the reinforcing cord 26 makes it difficult for the reinforcing cord 26 to come away from the embedded portion. Embedding the whole of the reinforcing cord 26 in the crown portion 16 gives a flat surface (outer circumferential surface), and enables air to be suppressed from being incorporated at a reinforcing cord circumferential portion even when a member is placed on the crown portion 16 embedded with the reinforcing cord 26.

As described above, the tread 30 is disposed at the tire radial direction outer circumferential side of the reinforcing cord 26. The rubber employed in the tread 30 is preferably the same type of rubber as the rubber employed in a conventional rubber-made pneumatic tire. Note that in place of the tread 30, a tread formed of another type of thermoplastic resin material with more excellent abrasion resistance than the resin material forming the tire case 17 may be employed. A tread pattern of plural grooves is formed in the road surface contact face of the tread 30, similarly to in a conventional rubber-made pneumatic tire.

Explanation follows regarding a manufacturing method of a first tire of the invention.

Tire Case Molding Process

First, tire case half parts supported by a thin metal support ring are aligned facing each other. Then placement is made in a jointing mold, not illustrated in the drawings, such that outer circumferential surfaces of the abutting portions of the tire case half parts make contact. The jointing mold is configured to press the periphery of the bonding section (the abutting portion) of the tire case half parts A with a specific pressure. Then the periphery of the bonding section of the tire case half parts is pressed at the melting point (or softening point) of the thermoplastic resin material forming the tire case or higher. The bonding section of the tire case half parts is heated and pressed by the jointing mold, melting the bonding section, welding the tire case half parts together, and forming these members into a single body of the tire case 17. Note that although in the present embodiment the bonding section of the tire case half parts is heated by using the jointing mold, the invention is not limited thereto, and, for example, the bonding sections may be heated by a separately provided high frequency heater, or the like, or pre-softened or melted by using hot air, irradiation with infrared radiation, or the like, and then pressed by the jointing mold. The tire case half parts may thus be bonded together.

Metal Reinforcing Cord Member Winding Process

Figure 3:
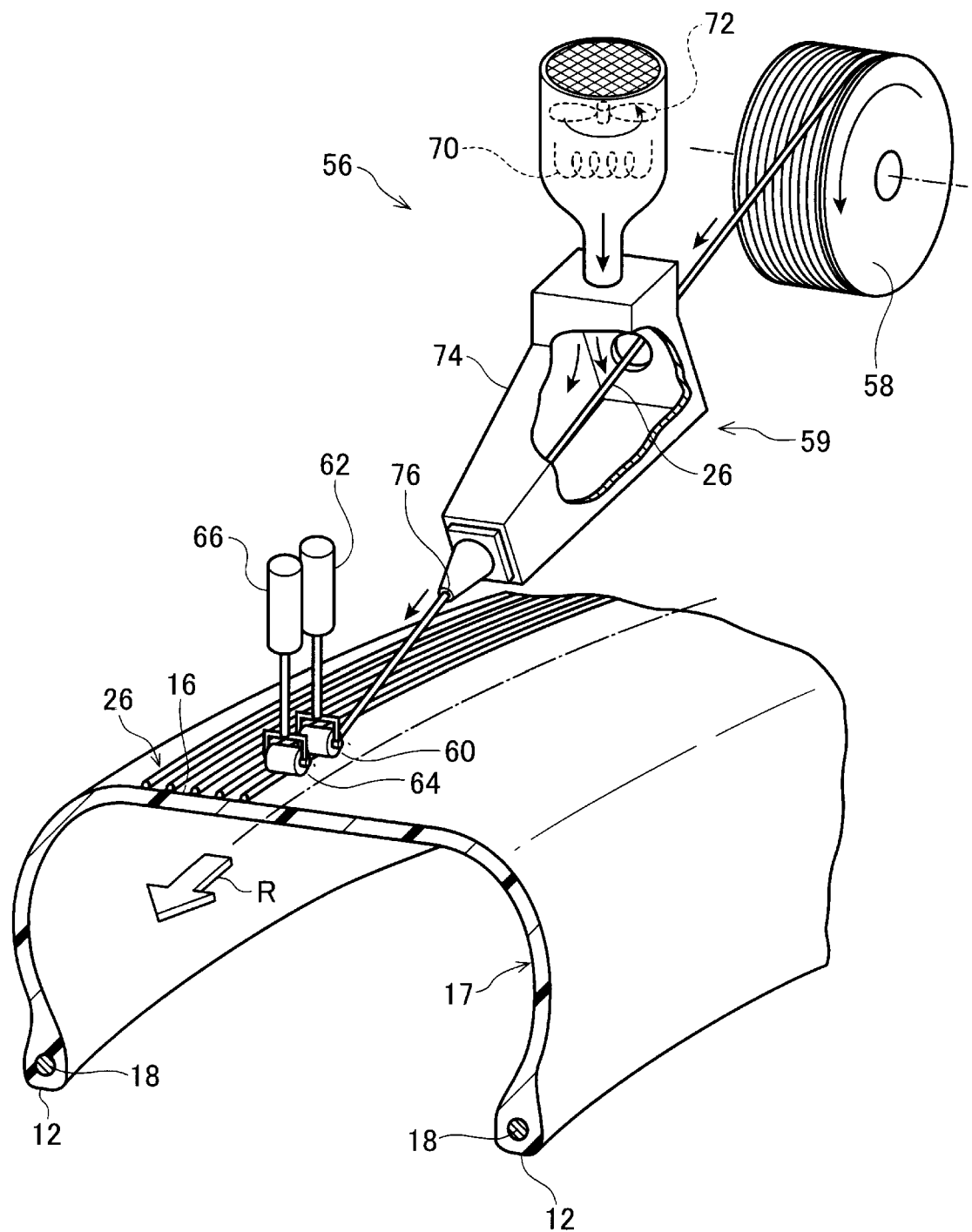
FIG. 3 is an explanatory diagram to explain an operation that embeds the reinforcing cord in the crown portion of a tire case using a cord heating device and rollers.

Explanation next follows regarding a reinforcing cord winding process, with reference to FIG. 3. FIG. 3 is an explanatory diagram to explain an operation that embeds the reinforcing cord in the crown portion of a tire case, using a cord heating device and rollers. In FIG. 3, a cord feeding apparatus 56 is equipped with: a reel 58 wound with reinforcing cord 26; a cord heating device 59 disposed at the cord conveying direction downstream side of the reel 58; a first roller 60 disposed at the reinforcing cord 26 conveying direction downstream side; a first cylinder device 62 to move the first roller 60 in a direction towards, or away from, the tire outer circumferential surface; a second roller 64 disposed at the reinforcing cord 26 conveying direction downstream side of the first roller 60; and a second cylinder device 66 to move the second roller 64 in a direction towards, or away from, the tire outer circumferential surface. The second roller 64 may be employed as a cooling roller made of metal. In the present embodiment, the surface of the first roller 60 or the second roller 64 is coated with a fluorine resin (TEFLON (registered trademark) in the present embodiment) to suppress adhesion of the melted or softened resin material. Note that in the present embodiment, the cord feeding apparatus 56 is configured with the two rollers, the first roller 60 or the second roller 64; however, the invention is not limited to such a configuration, and may be configured with one of the rollers alone (namely, a single roller). The cord member 26 wound on the reel 58 is a winding of the steel cord 27 covered with the first specific covering mixture 28.

The cord heating device 59 is equipped with a heater 70 and a fan 72 for generating hot air. The cord heating device 59 is also equipped with a heating box 74 that is supplied inside with hot air and through an interior space of which the reinforcing cord 26 passes, and a discharge outlet 76 that dispenses the heated reinforcing cord 26.

In the present process, first, the temperature of the heater 70 is raised in the cord heating device 59, and the surrounding air heated by the heater 70 is formed into an airflow by rotation of the fan 72 and delivered into the heating box 74. The reinforcing cord 26 unwound from the reel 58 is then fed into the heating box 74, of which the internal space has been heated by the hot airflow, and heated (for example, the temperature of the reinforcing cord 26 is heated to from approximately 100° C. to approximately 200° C.). The heated reinforcing cord 26 passes through the discharge outlet 76, and is wound under a constant tension in a helical shape on the outer circumferential surface of the crown portion 16 of the tire case 17 rotating in the arrow R direction in FIG. 3. When the heated reinforcing cord 26 contacts the outer circumferential surface of the crown portion 16, the resin material of the contact portion melts or softens, and at least a portion of the heated reinforcing cord 26 is embedded in the outer circumferential surface of the crown portion 16. When this is performed, due to the heated reinforcing cord 26 being embedded in the melted or softened resin material, a state is achieved in which there are no gaps between the resin material and the reinforcing cord 26, namely a close contact state. Incorporation of air into the portion where the reinforcing cord 26 is embedded is thereby suppressed. Heating the reinforcing cord 26 to a higher temperature than the melting point (or softening point) of the resin material forming the tire case 17 promotes melting or softening of the resin material at the portion contacted by the reinforcing cord 26. This thereby enables the reinforcing cord 26 to be readily embedded in the outer circumferential surface of the crown portion 16, and enables the incorporation of air to be effectively suppressed.

The depth L of embedding of the reinforcing cord 26 can be adjusted using the heating temperature of the reinforcing cord 26, the tension acting on the reinforcing cord 26, the pressure of the first roller 60, and the like. In the present embodiment, the depth L of embedding of the reinforcing cord 26 is set to be ⅕ of the diameter D of the reinforcing cord 26 or greater. The depth L of embedding of the reinforcing cord 26 more preferably exceeds ½ the diameter D of the reinforcing cord 26, and most preferably the whole of the reinforcing cord 26 is embedded.

Then the fully vulcanized, belt-shaped, tread 30 is wound a single turn around the outer circumferential surface of the tire case 17, and the tread 30 is bonded to the outer circumferential surface of the tire case 17, with a bonding agent or the like. Note that the tread 30 may, for example, be a pre-cured tread employed in conventional known recycled tires. The present process is similar to the process for bonding a pre-cured tread to the outer circumferential surface of a casing of a recycled tire.

Bonding the seal layers 24, formed of a fully vulcanized rubber, to the bead portions 12 of the tire case 17 with a bonding agent or the like thereby completes the tire 10.

Effects

In the tire 10 of the present embodiment, the reinforcing cord 26 having the steel cord 27 as the core, covered with the first specific covering mixture 28, is wound onto the outer circumferential surface of the tire case 17 formed of the polyamide-based thermoplastic elastomer. The first specific covering mixture 28 including the polyamide-based thermoplastic resin and the polystyrene-based thermoplastic elastomer has high adhesiveness to the polyamide-based thermoplastic elastomer forming the tire case 17, and has a lower rigidity difference to the polyamide-based thermoplastic elastomer than the steel cord. Due to the reinforcing cord 26 being covered in this manner with the first specific covering mixture that includes the polyamide-based thermoplastic resin and the polystyrene-based thermoplastic elastomer, a smaller difference in hardness between the tire case 17 and the reinforcing cord 16 can be achieved than in cases in which the steel cord 27 is simply fixed by a cushion rubber. Thus sufficient adhesion and fixing to the tire case 17 can be achieved for the reinforcing cord 26 having the steel cord 27 as the core. Due to thereby being able to effectively prevent air bubbles from remaining during tire manufacture, movement of the metal reinforcing cord member can be effectively suppressed during running. Moreover, the first specific covering mixture that includes the polyamide-based thermoplastic resin and the polystyrene-based thermoplastic elastomer is more easily imparted with flexibility than cases in which a single polyamide-based thermoplastic resin is employed alone. The desired flexibility can accordingly be achieved with a smaller covering amount than when a single polyamide-based thermoplastic resin is employed alone.

In the tire 10 of the present embodiment, the puncture resistance performance, cut resistance performance, and the circumferential direction rigidity of the tire 10 are improved due to winding the reinforcing cord 26 that has a higher rigidity than the resin material, onto the outer circumferential surface of the crown portion 16 of the tire case 17 formed of the resin material, so as to give a helical shape around the circumferential direction. Raising the circumferential direction rigidity of the tire 10 prevents creep of the tire case 17 formed of the thermoplastic resin material.

Due to at least a portion of the reinforcing cord 26 being embedded in and in close contact with the resin material in the outer circumferential surface of the crown portion 16 of the resin material-formed tire case 17 in a cross-section taken along the axial direction of the tire case 17 (the cross-section illustrated in FIG. 1), incorporation of air during manufacture is suppressed, and the reinforcing cord 26 is suppressed from moving under force input during running, or the like. Delamination or the like of the reinforcing cord 26, the tire case 17, and the tread 30 is thereby suppressed from occurring, improving the durability of the tire 10.

As illustrated in FIG. 2, the depth L of embedding of the reinforcing cord 26 is ⅕ of the diameter D or greater, and so the incorporation of air during manufacture is effectively suppressed, further suppressing the reinforcing cord 26 from moving under force input during running, or the like.

Moreover, the annular bead cores 18 formed of a metal material are embedded in the bead portions 12, and so, similarly to a conventional rubber-made pneumatic tire, the tire case 17, namely the tire 10, is firmly retained on the rim 20.

The above embodiment is configured by heating the reinforcing cord 26, with the surface of the tire case 17 melting or softening at the portions where the heated reinforcing cord 26 makes contact; however, the invention is not limited to such a configuration, and the reinforcing cord 26 may be embedded in the crown portion 16 after using a hot airflow generation device to heat the outer circumferential surface of the crown portion 16 where the reinforcing cord 26 is to be embedded, without heating the reinforcing cord 26.

In the 1-1 embodiment, the heat source of the cord heating device 59 is a heater and a fan; however, the invention is not limited to such a configuration, and configuration may be made to directly heat the reinforcing cord 26 with radiation heat (such as, for example, by infrared radiation).

In the 1-1 embodiment, melted or softened portions of the thermoplastic resin material in which the reinforcing cord 26 is embedded are force cooled by the metal second roller 64; however, the invention is not limited thereto. Configuration may be made such that the melted or softened portions of the thermoplastic resin material are directly blasted with cooling air, and the melted or softened portions of the thermoplastic resin material are forcibly cooled and hardened.

Winding the reinforcing cord 26 in a helical shape facilitates manufacture; however, methods in which reinforcing cord 26 is discontinuous in the width direction, or the like, may also be considered.

In the tire 10 of the 1-1 embodiment, the bead portions 12 are fitted to the rim 20 so as to form an air chamber between the tire 10 and the rim 20, and this is what is referred to as a tubeless tire; however, the invention is not limited to such a configuration, and may be formed into a complete tube shape.

1-2 Embodiment

Figure 4:
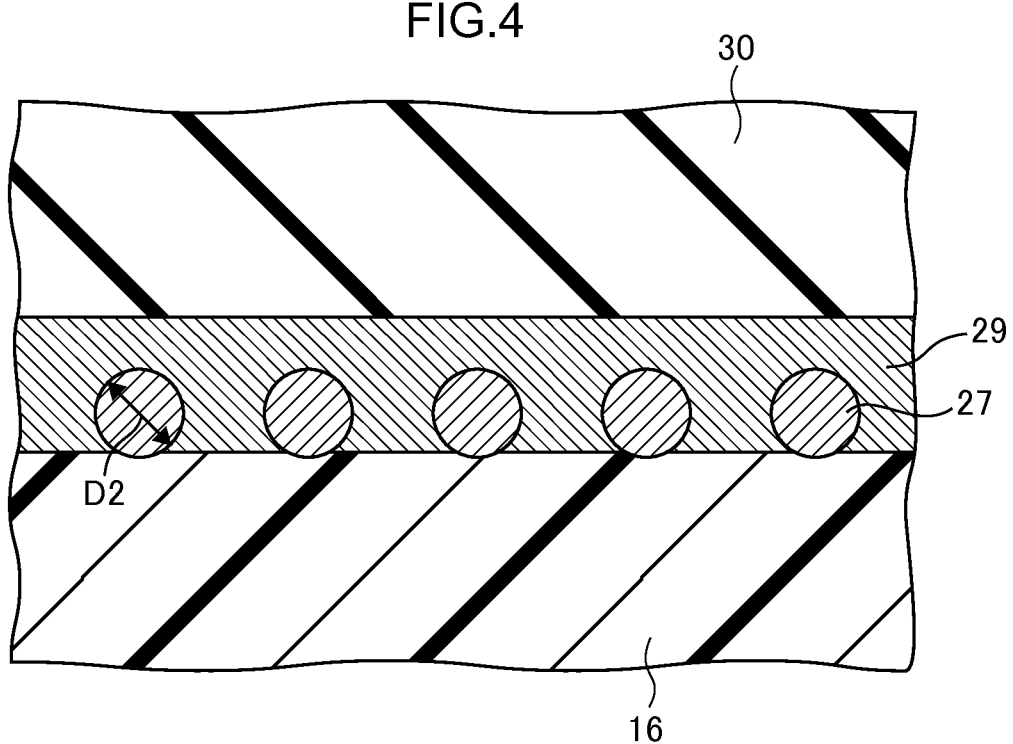
FIG. 4 is a cross-section taken along the tire rotation axis of a tire of a 1-2 embodiment, and illustrating a state in which there is a reinforcing cord covering layer, in which a metal reinforcing cord member is embedded, on a crown portion of a tire case.

Explanation next follows regarding a 1-2 embodiment that is a second embodiment of a first tire of the invention, with reference to the drawings. FIG. 4 is a cross-section view, taken along the tire rotation axis, illustrating a configuration with a reinforcing cord covering layer embedded with a metal reinforcing cord member above a crown portion of a tire case of a tire of the 1-2 embodiment. As illustrated in FIG. 4, the tire of the present embodiment includes a reinforcing cord covering layer 29 embedded with the steel cord 27 (the metal reinforcing cord member) on the surface of the crown portion 16 of the tire case. A tread 30 is disposed above the reinforcing cord covering layer 29. The tire according to the 1-2 embodiment has a configuration similar to that of the 1-1 embodiment, except in the above points, and the same reference numerals are allocated to configuration similar to that of the 1-1 embodiment.

The tire of the 1-2 embodiment is configured employing a polyamide-based thermoplastic elastomer as a tire case 17 and a steel cord 27, similarly to in the 1-1 embodiment described above.

In the tire of the present embodiment, as illustrated in FIG. 4, the reinforcing cord covering layer 29 embedded with the steel cord 27 wound in the circumferential direction of the tire case 17 is provided on the crown portion 16. A portion of the steel cord 27 is embedded in the surface of the crown portion 16 of the tire case 17. The reinforcing cord covering layer 29 is configured with the first specific covering mixture (a similar first specific covering mixture to that of the 1-1 embodiment) including at least a specific thermoplastic resin and an acid-modified olefin-based thermoplastic resin. There are no particular limitations to the layer thickness of the reinforcing cord covering layer 29, and in consideration of the durability and adhesiveness to the tire case 17 and the tread 30, preferably the average layer thickness is from approximately 0.2 mm to approximately 4.0 mm, more preferably from 0.5 mm to 3.0 mm, and particularly preferably from 0.5 mm to 2.0 mm.

The elastic modulus of the reinforcing cord covering layer 29 is preferably set in the range higher than the elastic modulus of the resin material forming the tire case 17, and lower than the elastic modulus of the steel cord 27. When the elastic modulus of the reinforcing cord covering layer 29 is 10 times the elastic modulus of the thermoplastic resin material forming the tire case 17 or lower, the crown portion is not too hard, and fitting onto a rim is easily achieved.

Explanation next follows regarding a manufacturing method of a tire of the present embodiment.

Frame Molding Process

First, similarly to in the 1-1 embodiment described above, the tire case half parts 17A are formed, and the tire case 17 is then formed by heating and pressing these with a jointing mold.

Metal Reinforcing Cord Member Winding Process

In a manufacturing apparatus of the tire of the present embodiment, similarly to in the 1-1 embodiment described above, in the cord feeding apparatus 56 illustrated in FIG. 3 regarding the 1-1 embodiment, the steel cord 27 wound on a reel 58 is employed. Then the steel cord 27 wound on the reel 58 is, similarly to in the 1-1 embodiment, wound along the outer circumferential surface of the tire case 17 while embedding a portion thereof in the outer circumferential surface. In the present embodiment, the surface of the steel cord 27 is covered by the first specific covering mixture material that at least includes the specific thermoplastic resin and an acid-modified olefin-based thermoplastic resin by embedding the steel cord 27 in the formed reinforcing cord covering layer 29. A depth L of embedding in the tire case 17 with respect to a diameter $D_2$ of the steel cord 27 is preferably set at ⅕ of a diameter $D_1$ of the steel cord 27 or less.

Layering Process

Next, the first specific covering mixture is coated using a melt-extruder or the like, not illustrated in the drawings, onto the outer circumferential surface of the tire case 17 that has been embedded with the steel cord 27, to form the reinforcing cord covering layer 29.

Then the non-vulcanized state cushion rubber 29 is wrapped one turn onto the reinforcing cord covering layer 29, and, for example, an adhesive such as a rubber cement composition is coated onto the cushion rubber 29, and then one turn of a tread rubber 30A in a fully vulcanized or semi-vulcanized state is wound onto the adhesive, thereby configuring a base tire case state.

Then the fully vulcanized, belt-shaped, tread 30 is wound a single turn around the outer circumferential surface of the tire case 17, and the tread 30 is bonded to the outer circumferential surface of the tire case 17, with a bonding agent or the like. Note that the tread 30 may, for example, be a pre-cured tread employed in conventional known recycled tires. The present process is similar to the process for bonding a pre-cured tread to the outer circumferential surface of a casing of a recycled tire.

Bonding the seal layers 24, formed of a fully vulcanized rubber, to the bead portions 12 of the tire case 17 with a bonding agent or the like completes the tire 10.

Effects

According to the present embodiment, in addition to the effects of the 1-1 embodiment, providing the reinforcing cord covering layer 29 on the outer circumferential surface of the tire case 17 enables the steel cord 27 to be fixed even more strongly onto the tire case 17.

The steel cord 27 is also wound in the 1-2 embodiment in a helical shape onto the crown portion 16; however, the invention is not limited thereto, and the steel cord 27 may be wound so as to be discontinuous in the width direction.

2-1 Embodiment

Explanation next follows regarding a tire according to a 2-1 embodiment, that is a first embodiment of a second tire of the invention, with reference to the drawings. The second tire according to the 2-1 embodiment of the invention employs a second specific covering mixture in place of the first specific covering mixture employed in the tire of the 1-1 embodiment. Namely, configuration is similar except in the point that the second specific covering mixture is employed in place of the first specific covering mixture as the covering mixture to cover the reinforcing cord 26 of the tire 10 explained in FIG. 1 to FIG. 3.

Therefore, explanation follows regarding the present embodiment with reference to FIG. 1 to FIG. 3, and explanation related to similar members is omitted.

Explanation follows regarding the tire 10 of the 2-1 embodiment. In the 2-1 embodiment, a steel cord (with a tensile elastic modulus of 210000 MPa, and an elongation at break of 8%), having a twisted structure, is employed as the metal reinforcing cord member, and a reinforcing cord 26 is employed, in which the second specific covering mixture, including at least a thermoplastic resin and the specific copolymer, covers the outer circumference of the steel cord which acts as a core. In the 2-1 embodiment, explanation follows regarding an example employing a mixture (tensile elastic modulus 947 MPa, tensile strength 38 MPa, elongation at break 135%) of amide 12 that is a polyamide-based thermoplastic resin (for example a 1:1 (mass ratio) mixture of "3014U" and "3024U" manufactured by Ube Industries Ltd.), at 80% by mass, as the thermoplastic resin, and "NUCREL N1035C" manufactured by Du Pont-Mitsui Polychemicals Co., Ltd, at 20% by mass, as the specific copolymer.

The tire case 17 of the 2-1 embodiment is configured using a polyamide-based thermoplastic elastomer (for example UBESTA "XPA9055X1", manufactured by Ube Industries Ltd.: tensile elastic modulus 303 MPa, elongation at break 350%, tensile strength 41 MPa).

In the tire 10 of the 2-1 embodiment, as illustrated in FIG. 2, the reinforcing cord 26 has a structure in which steel cord 27 of twisted steel fibers acts as the core, with the outer circumference of the steel cord 27 covered by a second specific covering mixture 28 that includes at least a thermoplastic resin and the specific copolymer. There are no particular limitations to the layer thickness of the second specific covering mixture 28 that covers the steel cord 27, and the average layer thickness is preferably from approximately 0.2 mm to approximately 4.0 mm, is more preferably from 0.5 mm to 3.0 mm, and is particularly preferably from 0.5 mm to 2.0 mm. The elastic modulus of the second specific covering mixture 28 is preferably set in the range of from 0.1 times to 20 times the elastic modulus of the resin material forming the tire case 17. When the elastic modulus of the second specific covering mixture 28 is 20 times the elastic modulus of the thermoplastic resin material forming the tire case 17 or lower, the crown portion is not too hard and fitting onto a rim is easily achieved. When the elastic modulus of the second specific covering mixture 28 is 0.1 times the elastic modulus of the thermoplastic resin material forming the tire case 17 or greater, the second specific covering mixture 28 is not too soft, and belt in-plane shear stiffness is excellent, and cornering force is raised.

The manufacturing method of the second tire of the 2-1 embodiment of the invention may be performed similarly to the manufacturing method of the first tire of the 1-1 embodiment of the invention, except in that the second specific covering mixture is employed in place of the first specific covering mixture.

Effects

In the tire 10 of the 2-1 embodiment, the reinforcing cord 26 having the steel cord 27 as the core, covered with the second specific covering mixture 28, is wound onto the outer circumferential surface of the tire case 17 formed of the polyamide-based thermoplastic elastomer. The second specific covering mixture 28, including the polyamide-based thermoplastic resin and the polystyrene-based thermoplastic elastomer, has high adhesiveness to the polyamide-based thermoplastic elastomer forming the tire case 17, and has a lower rigidity difference to the polyamide-based thermoplastic elastomer than the steel cord. Due to the reinforcing cord 26 being covered in this manner with the second specific covering mixture that includes the polyamide-based thermoplastic resin and the polystyrene-based thermoplastic elastomer, a smaller difference in hardness between the tire case 17 and the reinforcing cord 16 can be achieved than in cases in which the steel cord 27 is simply fixed by a cushion rubber. Thus sufficient adhesion and fixing to the tire case 17 can be achieved for the reinforcing cord 26 having the steel cord 27 as the core. Due to thereby being able to effectively prevent air bubbles from remaining during tire manufacture, movement of the metal reinforcing cord member can be effectively prevented during running. Moreover, the second specific covering mixture that includes the polyamide-based thermoplastic resin and the polystyrene-based thermoplastic elastomer is more easily imparted with flexibility than cases in which a single polyamide-based thermoplastic resin is employed alone. The desired flexibility can accordingly be achieved with a smaller covering amount than when a single polyamide-based thermoplastic resin is employed alone.

In the tire 10 of the 2-1 embodiment, the puncture resistance performance, cut resistance performance, and the circumferential direction rigidity of the tire 10 are improved due to winding the reinforcing cord 26, that has a higher rigidity than the resin material, onto the outer circumferential surface of the crown portion 16 of the tire case 17 formed of the resin material, so as to give a helical shape around the circumferential direction. Raising the circumferential direction rigidity of the tire 10 prevents creep of the tire case 17 formed of the thermoplastic resin material.

Due to at least a portion of the reinforcing cord 26 being embedded in and in close contact with the resin material in the outer circumferential surface of the crown portion 16 of the resin material-formed tire case 17 in a cross-section taken along the axial direction of the tire case 17 (the cross-section illustrated in FIG. 1), incorporation of air during manufacture is suppressed, and the reinforcing cord 26 is suppressed from moving under force input during running, or the like. Delamination or the like of the reinforcing cord 26, the tire case 17, and the tread 30 is thereby suppressed from occurring, improving the durability of the tire 10.

As illustrated in FIG. 2, the depth L of embedding of the reinforcing cord 26 is ⅕ of the diameter D or greater, and so the incorporation of air during manufacture is effectively suppressed, further suppressing the reinforcing cord 26 from moving under force input during running, or the like.

Moreover, the annular bead cores 18 formed of a metal material are embedded in the bead portions 12, and so similarly to a conventional rubber-made pneumatic tire, the tire case 17, namely the tire 10, is firmly retained on the rim 20.

The 2-1 embodiment is configured by heating the reinforcing cord 26, with the surface of the tire case 17 melting or softening at the portions where the heated reinforcing cord 26 makes contact; however, the invention is not limited to such a configuration, and the reinforcing cord 26 may be embedded in the crown portion 16 after using a hot airflow generation device to heat the outer circumferential surface of the crown portion 16 where the reinforcing cord 26 is to be embedded, without heating the reinforcing cord 26.

In the 2-1 embodiment, the heat source of the cord heating device 59 is a heater and a fan; however, the invention is not limited thereto, and configuration may be made such that radiation heat (such as infrared radiation) directly heats the reinforcing cord 26.

Moreover, in the 2-1 embodiment, melted or softened portions of the thermoplastic resin material in which the reinforcing cord 26 is embedded are force cooled by the metal second roller 64; however, the invention is not limited thereto. Configuration may be made such that the melted or softened portions of the thermoplastic resin material are directly blasted with cooling air, and the melted or softened portions of the thermoplastic resin material are forcibly cooled and hardened.

Winding the reinforcing cord 26 in a helical shape facilitates manufacture; however, methods in which reinforcing cord 26 is discontinuous in the width direction, or the like, may also be considered.

In the tire 10 of the 2-1 embodiment, the bead portions 12 are fitted to the rim 20 so as to form an air chamber between the tire 10 and the rim 20, and this is what is referred to as a tubeless tire; however, the invention is not limited to such a configuration, and may be formed into a complete tube shape.

2-2 Embodiment

Explanation next follows, based on the drawings, regarding a tire according to a 2-2 embodiment that is a second embodiment of the second tire of the invention. The second tire according to the 2-2 embodiment of the invention employs a second specific covering mixture in place of the first specific covering mixture employed in the tire of the 1-2 embodiment. Namely, configuration is similar except in that the second specific covering mixture is employed in place of the first specific covering mixture as the covering mixture included in a reinforcing cord covering layer 29 explained with reference to FIG. 4.

Therefore, explanation follows of the present embodiment with reference to FIG. 4, and explanation of similar members is omitted.

The tire of the 2-2 embodiment is configured employing a polyamide-based thermoplastic elastomer as a tire case 17 and a steel cord 27, similarly to in the 2-1 embodiment.

The tire of the 2-2 embodiment, as illustrated in FIG. 4, is provided with a reinforcing cord covering layer 29 embedded with the steel cord 27 wound in the tire case 17 circumferential direction onto the crown portion 16. A portion of the steel cord 27 is embedded in the surface of the crown portion 16 of the tire case 17. The reinforcing cord covering layer 29 includes a second specific covering mixture including at least a thermoplastic resin and a specific copolymer (the second specific covering mixture similar to the 2-1 embodiment). There are no particular limitations to the layer thickness of the reinforcing cord covering layer 29, and in consideration of the durability, and the adhesiveness between the tire case 17 and the tread 30, the average layer thickness is preferably from approximately 0.2 mm to approximately 4.0 mm, more preferably from 0.5 mm to 3.0 mm, and particularly preferably from 0.5 mm to 2.0 mm.

The elastic modulus of the reinforcing cord covering layer 29 is preferably set in the range higher than the elastic modulus of the resin material forming the tire case 17, and lower than the elastic modulus of the steel cord 27. When the elastic modulus of the reinforcing cord covering layer 29 is 20 times the elastic modulus of the thermoplastic resin material forming the tire case 17 or lower, the crown portion is not too hard, and fitting onto a rim is easily achieved.

The manufacturing method of the second tire of the 2-2 embodiment of the invention may be performed similarly to the manufacturing method of the first tire of the 1-2 embodiment of the invention, except in that the second specific covering mixture is employed in place of the first specific covering mixture.

Effects

According to the 2-2 embodiment, in addition to the effects of the 2-1 embodiment, the reinforcing cord covering layer 29 is provided on the outer circumferential surface of the tire case 17, and so the steel cord 27 can be even more strongly fixed to the tire case 17.

Although the steel cord 27 is wound in a helical shape onto the crown portion 16 in the 2-2 embodiment too, the invention is not limited thereto, and the steel cord 27 may be wound so as to be discontinuous in the width direction.

Although embodiments have been given, and the first embodiment of the invention and the second embodiment of the invention have been explained above, these embodiments are merely examples, and various modifications may be implemented within a range not departing from the spirit of the invention. Obviously the scope of rights of the invention is not limited to these embodiments.

EXAMPLES

Specific explanation regarding the invention is given below based on Examples of the invention.

Evaluation of Elongation at Break, Tensile Elastic Modulus, and Tensile Strength Compositions of resins (covering mixtures) as listed in Table 1 and Table 2 were mixed (by mass), kneaded using a twin screw extruder LABOPLASTOMILL 50MR, manufactured by Toyo Seiki Seisaku-sho, Ltd., and pellets obtained. Regarding the rubber component, rubber pellets were obtained according to the method described below.

The obtained pellets were employed, the pellets pressed by a heat press at 200° C., and trimming performed to manufacture sheet A of size 120 mm×120 mm, and thickness 2.0 mm. Each of the test samples was taken out, and dumbbell-shaped test samples (No. 5 shaped test samples) were manufactured according to JIS K6251-1993.

Then, using a Shimadzu Autograph AGS-J (5KN), manufactured by Shimadzu Corporation, the tensile elastic modulus, the tensile strength, and the elongation at break of each of the dumbbell-shaped test samples were measured under conditions of an elongation rate of 200 mm/min. The results are listed in Table 1 and Table 2 below.

Table 1 lists Example 1-1 to Example 1-5 of the first tire of the invention, and Comparative Example 1-1, and Table 2 lists Example 2-1 to Example 2-3 of the second tire of the invention, and Comparative Example 2-1.

Heat Fusion Peel Strength

The resins (covering mixtures) listened in Table 1 and Table 2 were pressed using a heat press at 200° C., trimming performed, and a sheet B prepared of thickness 2.5 mm. Then, a sheet of thickness 4.5 mm was produced by heat fusing the obtained sheet B onto a polyamide-based thermoplastic elastomer to be employed in a tire frame (UBESTA "XPA9055X1", manufactured by Ube Industries Ltd.: tensile elastic modulus 303 MPa, elongation at break 350%, tensile strength 41 MPa). The resultant sheet was cut into widths of 25 mm, and sample pieces of size 130 mm×25 mm×4.5 mm produced. The heat fusion peel strength was measured by subjecting the produced sample pieces to T-type (180°) peel tensile testing using a Shimadzu Autograph AGS-J (5 KN) manufactured by Shimadzu Corporation, at 23° C. and 50 mm/min. The testing was performed twice, and the average value thereof employed as the evaluation value. Larger evaluation values indicate more excellent adhesiveness between the covering mixture and the tire frame. The results are shown in the following Table 1 and Table 2.

Flowability Evaluation (MFR (g/10 Minutes, 200° C.)

For each of the above produced pellets, a semi melt indexer model 2A, manufactured by Toyo Seiki Seisaku-sho, Ltd. was employed, and based on ASTM A1238 (method B), the flowability (MFR: units g/10 minutes) was measured under a load of 98.07 N. Larger numerical values of the evaluation value indicate more excellent ease-of-handling of the covering mixture. The results are shown in the following Table 1 and Table 2.

Pull-Out Test

First a monofilament of φ 0.8 mm was set at the center of a circular column shaped mold of φ 10 mm, and length 60 mm.

Then the cavity portion of the circular column shaped mold was loaded with each of the resins (covering mixtures) listed in following Table 1, and injection molding performed. The obtained resin was cooled, and circular column shaped test samples obtained in which a brass-plated wire was set at the center of a resin portion.

For each of the obtained test samples, using an "AG-5KNK" manufactured by Shimadzu Corporation, the wire was pulled from the resin portion at a rate of 50 mm/min, and the pull-out force (units: N) measured during pull-out. Base on the measured values, the pull-out resistance of each of the test samples was evaluated according to the following criteria. Larger pull-out force indicates more excellent pull-out resistance of the metal reinforcing cord member.

TABLE 1

|  |  | Comp. Ex. 1-1 | Ex. 1-1 | Ex. 1-2 | Ex. 1-3 | Ex. 1-4 | Ex. 1-5 |
|---|---|---|---|---|---|---|---|
| Thermoplastic Resin (Parts by Mass) | Nylon 12 | 40 | 70 | 60 | 60 | 60 | 60 |
| Specific Acid-modified Polyolefin (Parts by Mass) | ADMER | — | 30 | 40 | 20 | 20 | 20 |
| Specific Unmodified Polyolefin (Parts by Mass) | R-TPO | — | — | — | 20 | — | — |
|  | V-TPO | — | — | — | — | 20 | — |
|  | NOTIO | — | — | — | — | — | 20 |
| Other Component | Rubber Component | 60 | — | — | — | — | — |
| Property of Covering mixture | Tensile Strength (MPa) | 11 | 36 | 34 | 27 | 23 | 25 |
|  | Elongation at Break (%) | 15 | 240 | 140 | 55 | 50 | 260 |
|  | Tensile Elastic Modulus (MPa) | 419 | 1130 | 1100 | 903 | 840 | 840 |
|  | Heat Fusion Peel Strength (Adhesiveness) (N) | 195 | 475 | 425 | 500 | 340 | 648 |
|  | MFR (g/10 min) | 3.5191 | 57.447 | 47.974 | 62.531 | 85.01 | 58.61 |
|  | Pull-Out Test (N) | 19.99 | 627.54 | 593.01 | 171.79 | 95.73 | 606.62 |

* The abbreviated names in Table 1 refer to the following.
Nylon 12 (the specific thermoplastic resin) A 1:1 (mass ratio) mixture of "3014U" and "3024U", manufactured by Ube Industries, Ltd.
ADMER (the specific acid-modified polyolefin) "ADMER QF551" (tensile elastic modulus = 694 MPa or above) manufactured by Mitsui Chemicals, Inc.
R-TPO (the specific unmodified polyolefin) "R-TPO M142E" manufactured by Prime Polymer Co., Ltd.
V-TPO (the specific unmodified polyolefin) "V-TPO 7030N" manufactured by Mitsui Chemicals, Inc.
NOTIO (the specific unmodified polyolefin) "NOTIO PN-2070" manufactured by Mitsui Chemicals, Inc.

TABLE 2

|  |  | Comparative Example 2-1 | Example 2-1 | Example 2-2 | Example 2-3 |
|---|---|---|---|---|---|
| Thermoplastic Resin (Parts by Mass) | Nylon 12 | 40 | 80 | 60 | 80 |
| Specific Copolymer (Parts by Mass) | E(M)A | — | 20 | — | — |
|  | EBA | — | — | 40 | — |
|  | EEA Acid Modified Product | — | — | — | 20 |
| Other Component (Parts by Mass) | Rubber Component | 60 | — | — | — |
| Property of Covering mixture | Tensile Strength (MPa) | 11 | 38 | 19 | 33 |
|  | Elongation at Break (%) | 15 | 135 | 20 | 55 |
|  | Tensile Elastic Modulus (MPa) | 419 | 947 | 606 | 1071 |
|  | Heat Fusion Peel Strength (Adhesiveness) (N) | 195 | 485 | 215 | 715 |
|  | MFR (g/10 min) | 3.5191 | 78.95 | 78.19 | 11.72 |
|  | Pull-Out Test (N) | 19.99 | 181.95 | 131.1 | 196.91 |

* The abbreviated names in Table 2 refer to the following.
Nylon 12 (the thermoplastic resin) A 1:1 (mass ratio) mixture of "3014U" and "3024U", manufactured by Ube Industries, Ltd.
E(M)A (ethylene-methacrylic acid copolymer) "NUCREL N1035C" manufactured by Du Pont-Mitsui Polychemicals Co., Ltd.
EBA (ethylene-butyl acrylate copolymer) "ELVALOY AC 3427" manufactured by Du Pont-Mitsui Polychemicals Co., Ltd.
EEA acid modified product (maleic acid anhydride-modified product of ethylene-ethylene acrylate copolymer) "TAFMER HPR AR2011" manufactured Mitsui Chemicals Inc.

Rubber Component

The rubber components of Table 1 and Table 2 were obtained in the following manner.

The components shown in Table 3 were mixed for 3 minutes at an initial temperature of 40° C. in a tightly sealed Banbury Mixer, and a rubber composition produced. After the obtained rubber composition was formed into a seal by rolling, pelletization was performed using a rubber pelletizer, and rubber pellets obtained.

TABLE 3

| Rubber Component Composition | Compounded Amount (Parts by Mass) |
|---|---|
| Br-IPMS (EXXPRO 3433, manufactured by Exxon Mobile Corporation) | 100 |
| GPF Carbon (SEAST V, manufactured by Tokai Carbon Co., Ltd.) | 60 |
| Paraffin Oil | 10 |
| Stearic Acid | 2 |
| Zinc Stearate | 1 |
| Zinc Oxide | 5 |

Each of the covering mixtures of Example 2-1 to Example 2-3 shown in Table 2 was confirmed to have an sea-island structure with a sea phase of thermoplastic resin and an island phase of specific elastomer by inspecting images captured with an SEM.

As can be seen from the results in Table 1 and Table 2, the covering mixtures of the Examples had higher pull-out resistance than for the Comparative Examples, and also had excellent adhesiveness to the thermoplastic elastomer (polyamide-based thermoplastic elastomer) forming the tire frame. Therefore, it was found that tires obtained by covering wires employing the covering mixtures of the Examples, and using these as a protection belt provided to the tire frame in which a resin material is employed, had excellent adhesion durability between the metal protection cord member (wire) and the tire frame. Upon performing actual running tests on tires formed using the materials of the above Examples and Comparative Examples, the result was that, similarly to above, the tires in which the materials of the Examples were used had excellent adhesion durability.

The disclosures of Japanese Patent Application No. 2012-044642 and Japanese Patent Application No. 2012-044643 are incorporated herein by reference.

All publications, patent applications, and technical standards mentioned in this specification are herein incorporated by reference to the same extent as if each individual publication, patent application, or technical standard was specifically and individually indicated to be incorporated by reference.

The invention claimed is:

1. A tire comprising:
a circular tire frame consisting of a polyamide-based thermoplastic elastomer; and
a metal reinforcing cord member wound on an outer circumference of the tire frame,
wherein at least a portion of the metal reinforcing cord member is covered by a covering mixture that consists of either i) an acid-modified olefin-based thermoplastic resin and a thermoplastic resin other than the acid-modified olefin-based thermoplastic resin, or ii) the acid-modified olefin-based thermoplastic resin, an unmodified olefin-based thermoplastic resin including an olefin having 3 or more carbon atoms as a monomer, and the thermoplastic resin other than the acid-modified olefin-based thermoplastic resin,
wherein the acid-modified olefin-based thermoplastic resin has an elastic modulus of 140 MPa or greater, and the ratio of the content of the thermoplastic resin other than the acid-modified olefin-based thermoplastic resin in the covering mixture to the total mass of the covering mixture is from 55% by mass to 95% by mass, resulting in the covering mixture having a sea-island structure, wherein the matrix sea phase is formed by the thermoplastic resin other than the acid-modified olefin-based thermoplastic resin, and the dispersed island phase is formed by either i) the acid-modified olefin-based thermoplastic resin when the unmodified olefin-based thermoplastic resin including an olefin having 3 or more carbon atoms as a monomer is not present in the covering mixture, or ii) the combination of the acid-modified olefin-based thermoplastic resin and the unmodified olefin-based thermoplastic resin including an olefin having 3 or more carbon atoms as a monomer when the unmodified olefin-based thermoplastic resin including an olefin having 3 or more carbon atoms as a monomer is present in the covering mixture, and
wherein an acid value of the acid-modified olefin-based thermoplastic resin is 0.1 mg-$CH_3ONa$/g or greater but less than 20.0 mg-$CH_3ONa$/g.

2. The tire of claim 1, wherein the acid-modified olefin-based thermoplastic resin is an acid-modified product of an α-olefin-based thermoplastic resin including an olefin having 3 or more carbon atoms as a monomer.

3. The tire of claim 1, wherein the covering mixture further includes the unmodified olefin-based thermoplastic resin including an olefin having 3 or more carbon atoms as a monomer.

4. The tire of claim 1, wherein a tensile elastic modulus of the tire frame (x1), a tensile elastic modulus of the covering mixture (x2), and a tensile elastic modulus of the metal reinforcing cord member (x3) satisfy the relationship x1<x2<x3.

5. The tire of claim 1, wherein an elongation at break of the tire frame (y1), an elongation at break of the covering mixture (y2), and an elongation at break of the metal reinforcing cord member (y3) satisfy the relationship y3<y2<y1.

6. The tire of claim 1, wherein the thermoplastic resin other than the acid-modified olefin-based thermoplastic resin included in the covering mixture is a polyamide-based thermoplastic resin.

7. The tire of claim 1, wherein the acid value of the acid-modified olefin-based thermoplastic resin is from 0.1 mg-$CH_3ONa$/g to 17.0 mg-$CH_3ONa$/g.

8. The tire of claim 1, wherein the acid value of the acid-modified olefin-based thermoplastic resin is from 0.1 mg-$CH_3ONa$/g to 15.0 mg-$CH_3ONa$/g.

* * * * *